US011512743B2

(12) United States Patent
Tomogami

(10) Patent No.: US 11,512,743 B2
(45) Date of Patent: Nov. 29, 2022

(54) CONSTANT VELOCITY UNIVERSAL JOINT

(71) Applicant: NTN CORPORATION, Osaka (JP)

(72) Inventor: Shin Tomogami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 734 days.

(21) Appl. No.: 16/095,450

(22) PCT Filed: Apr. 7, 2017

(86) PCT No.: PCT/JP2017/014595
§ 371 (c)(1),
(2) Date: Oct. 22, 2018

(87) PCT Pub. No.: WO2017/187947
PCT Pub. Date: Nov. 2, 2017

(65) Prior Publication Data
US 2019/0128333 A1    May 2, 2019

(30) Foreign Application Priority Data

Apr. 25, 2016 (JP) .............................. JP2016-086961
Aug. 30, 2016 (JP) .............................. JP2016-168141
Feb. 24, 2017 (JP) .............................. JP2017-033370

(51) Int. Cl.
*F16D 3/223* (2011.01)
*F16B 21/16* (2006.01)

(52) U.S. Cl.
CPC ............ *F16D 3/223* (2013.01); *F16B 21/165* (2013.01); *F16D 2003/22313* (2013.01); *F16D 2003/22316* (2013.01)

(58) Field of Classification Search
CPC ........ F16B 21/165; F16D 1/108; F16D 1/112; F16D 1/116; F16D 3/223; F16D 3/224;
(Continued)

(56) References Cited

U.S. PATENT DOCUMENTS 4,392,759 A * 7/1983 Cook .................... F16D 1/116
403/359.3
4,402,626 A * 9/1983 Recker .................. F16D 3/387
403/359.5

(Continued)

FOREIGN PATENT DOCUMENTS

DE        3909968 A1 * 9/1990 ............ F16B 21/165
JP        59-144223        9/1984
(Continued)

OTHER PUBLICATIONS

International Preliminary Report on Patentability dated Oct. 30, 2018 in International (PCT) Application No. PCT/JP2017/014595.
(Continued)

*Primary Examiner* — Josh Skroupa
(74) *Attorney, Agent, or Firm* — Wenderoth, Lind & Ponack, L.L.P.

(57) ABSTRACT

A constant velocity universal joint includes outer and inner joint members configured to transmit torque therebetween through intermediation of balls while allowing angular displacement. A power transmission shaft is coupled to the inner joint member. A mounting and dismounting mechanism configured to mount and dismount the power transmission shaft to and from the inner joint member is provided between the inner joint member and the power transmission shaft. The mounting and dismounting mechanism includes a tubular member inserted externally on the power transmission shaft so as to extend from the inner joint member, a fixing member received in the tubular member, and an annular member arranged on an outer periphery of the tubular member. The fixing member is moved in the radial direction along with movement of the annular member in the axial direction so that the fixing member is mountable to and dismountable from the power transmission shaft.

8 Claims, 15 Drawing Sheets

(58) Field of Classification Search
CPC ........... F16D 3/387; F16D 2003/22313; F16D 2003/22316; F16D 2003/22323; Y10S 464/901; Y10S 464/906; Y10T 403/7033
USPC ............... 464/145, 182, 901, 906; 403/359.5
See application file for complete search history.

(56) References Cited

U.S. PATENT DOCUMENTS

| | | | | |
|---|---|---|---|---|
| 4,431,334 | A * | 2/1984 | Cleveland | ............... F16D 3/387 403/322.2 |
| 4,433,934 | A * | 2/1984 | Cleveland | ............... F16D 1/116 403/318 |
| 4,756,640 | A | 7/1988 | Gehrke | |
| 4,813,808 | A | 3/1989 | Gehrke | |
| 4,957,387 | A * | 9/1990 | Nasu | ........................ F16D 3/387 403/359.5 |
| 5,577,859 | A * | 11/1996 | Nau | ........................ F16D 3/387 464/182 |
| 7,867,099 | B2 * | 1/2011 | Szentmihalyi | .......... F16D 3/223 464/182 |
| 8,070,613 | B2 * | 12/2011 | Cermak | ................ F16D 3/2237 464/182 |
| 8,425,141 | B2 * | 4/2013 | Disser | .................. F16D 3/2237 403/359.5 |
| 8,864,591 | B2 * | 10/2014 | Sugiyama | ............... F16D 3/223 403/359.5 |
| 9,284,990 | B2 * | 3/2016 | Oh | ......... F16D 3/223 |
| 10,184,524 | B2 * | 1/2019 | Oh | ......... F16D 3/224 |
| 10,920,832 | B2 * | 2/2021 | Oh | ......... F16D 3/223 |
| 2007/0087612 | A1 | 4/2007 | Tsujita | |
| 2010/0143075 | A1 | 6/2010 | Disser | |
| 2013/0252748 | A1 | 9/2013 | Sugiyama et al. | |
| 2014/0349771 | A1 | 11/2014 | Oh | |
| 2016/0017929 | A1 * | 1/2016 | Sugiyama | ............... F16D 3/223 464/142 |

FOREIGN PATENT DOCUMENTS

| | | |
|---|---|---|
| JP | 60-99387 | 7/1985 |
| JP | 62-102027 | 6/1987 |
| JP | 1-96515 | 6/1989 |
| JP | 2005-351348 | 12/2005 |
| JP | 2008-267517 | 11/2008 |
| JP | 5174153 | 4/2013 |
| JP | 2013-194895 | 9/2013 |
| JP | 5818390 | 11/2015 |

OTHER PUBLICATIONS

International Search Report dated Jul. 4, 2017 in International (PCT) Application No. PCT/JP2017/014595.

* cited by examiner

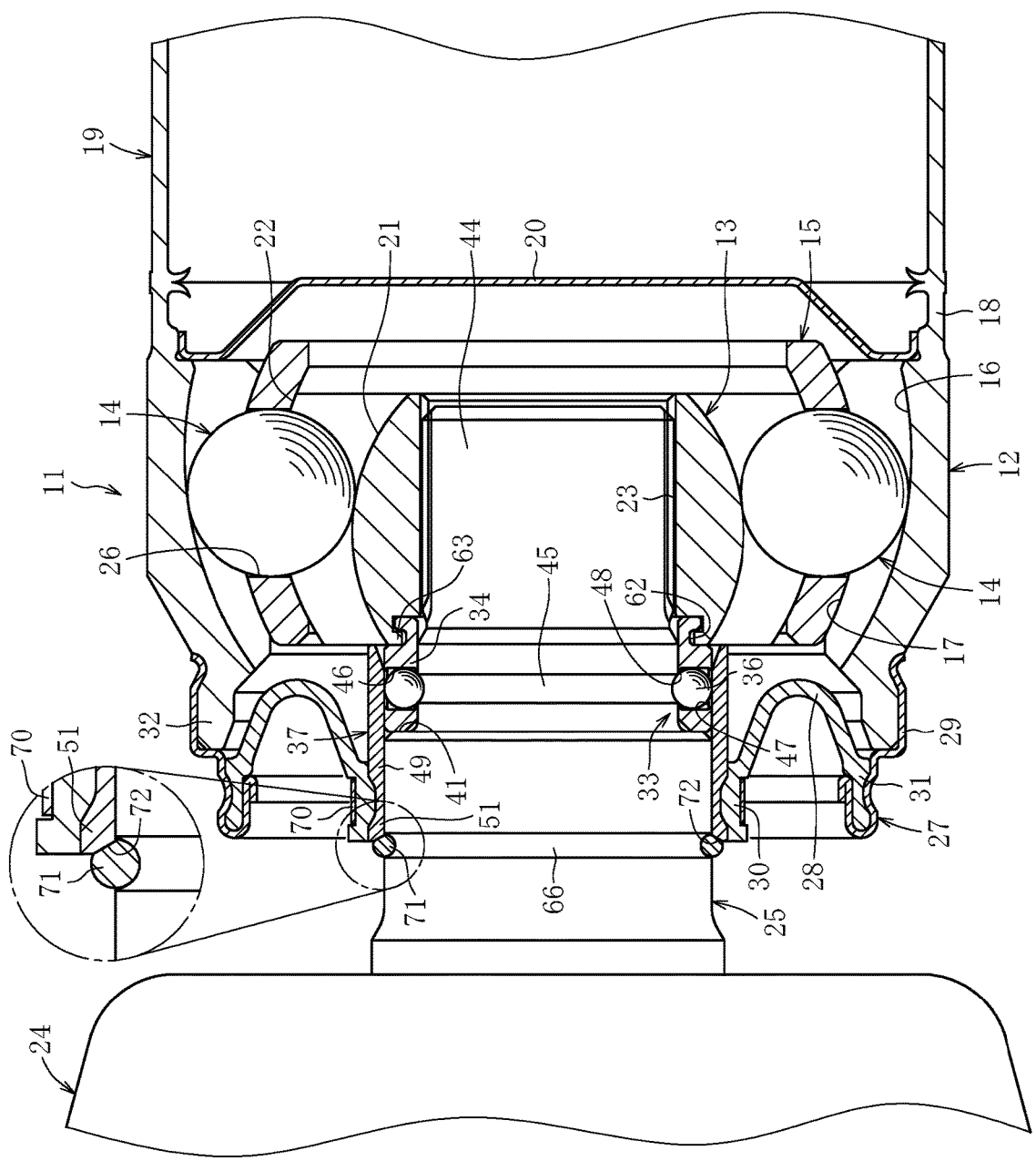

CONSTANT VELOCITY UNIVERSAL JOINT

TECHNICAL FIELD

The present invention relates to a constant velocity universal joint, which is to be used in power transmission systems for automobiles and various industrial machines, in particular, is to be mounted to a propeller shaft for an automobile.

BACKGROUND ART

As a constant velocity universal joint which is used as a unit configured to transmit a rotational force at constant velocity from an engine to a wheel of an automobile, there are given two types, specifically, a fixed type constant velocity universal joint and a plunging type constant velocity universal joint. Both of those constant velocity universal joints each have a structure capable of coupling two shafts on a driving side and a driven side to each other, and transmitting rotational torque at constant velocity even when each of the two shafts forms an operating angle.

It is required that a propeller shaft to be mounted to an automobile be adaptable to angular displacement and axial displacement caused by a change in relative positional relationship between a transmission and a differential. Therefore, in general, the propeller shaft has the following structure. Specifically, the fixed type constant velocity universal joint which allows only the angular displacement is installed on the transmission side, and the plunging type constant velocity universal joint which allows both the axial displacement and the angular displacement is installed on the differential side. Both the constant velocity universal joints are coupled to each other through intermediation of the propeller shaft.

The fixed type constant velocity universal joint includes an outer joint member, an inner joint member, a plurality of balls, and a cage. A power transmission shaft being an output shaft extending from the transmission is coupled to a shaft hole of the inner joint member by spline fitting so as to allow torque transmission therebetween. The power transmission shaft is retained by a snap ring so as to prevent removal from the inner joint member.

Hitherto, various structures have been proposed as a coupling structure for the power transmission shaft and the constant velocity universal joint in the propeller shaft (for example, see Patent Literatures 1 and 2).

The coupling structure disclosed in Patent Literature 1 has the following structure. Specifically, the inner joint member of the constant velocity universal joint is provided so as to extend to the power transmission shaft side in an axial direction, and the inner joint member and the power transmission shaft are fixed to each other by the snap ring at a part other than the spline fitting portion between the inner joint member and the power transmission shaft.

The coupling structure disclosed in Patent Literature 2 has the following structure. Specifically, a drive sleeve is coupled to the inner joint member of the constant velocity universal joint by spline fitting so as to allow torque transmission therebetween. A drive nut is coupled to the power transmission shaft, and the drive nut is fitted to the drive sleeve.

CITATION LIST

Patent Literature 1: JP 5174153 B2
Patent Literature 2: JP 5818390 B2

SUMMARY OF INVENTION

Technical Problem

Incidentally, in the above-mentioned propeller shaft, in order to perform component replacement or maintenance and inspection for the propeller shaft, it is required that the constant velocity universal joint be mountable to and dismountable from the power transmission shaft of the transmission. In the case of the coupling structures for the power transmission shaft and the constant velocity universal joint as disclosed in Patent Literatures 1 and 2, the following problems arise.

In the case of the coupling structure disclosed in Patent Literature 1, in order that the power transmission shaft and the inner joint member of the constant velocity universal joint be separable while ensuring the durability of the power transmission shaft against removal, the snap ring and a snap ring groove are to be chamfered or rounded.

However, in order to stabilize the retainability by the snap ring, it is required to design and manage the shape and the dimensions of chamfering or the like for the snap ring and the snap ring groove, which is extremely difficult, and it is difficult to design and manage optimum shape and dimensions.

In the case of the coupling structure disclosed in Patent Literature 2, the drive nut of the power transmission shaft is fitted to the drive sleeve extending from the inner joint member of the constant velocity universal joint. In this manner, the constant velocity universal joint can reliably be fixed to the power transmission shaft, and the constant velocity universal joint can easily be separated from the power transmission shaft.

However, in the case of the fitting structure by the drive sleeve and the drive nut, components of the drive sleeve and the drive nut are required. As a result, the number of components in the propeller shaft is increased, which may result in increase in cost of the propeller shaft.

Therefore, the present invention has been proposed in view of the above-mentioned problems, and has an object to provide a constant velocity universal joint in which an inner joint member and a power transmission shaft can reliably be fixed to each other and can easily be separated from each other with a simple structure.

Solution to Problem

According to one embodiment of the present invention, there is provided a constant velocity universal joint, comprising: an outer joint member; and an inner joint member, which is configured to transmit torque between the inner joint member and the outer joint member through intermediation of torque transmission members while allowing angular displacement, wherein a power transmission shaft is coupled to the inner joint member so as to allow torque transmission therebetween, wherein a mounting and dismounting mechanism configured to mount and dismount the power transmission shaft to and from the inner joint member is provided between the inner joint member and the power transmission shaft.

As a technical measure to achieve the above-mentioned object, the mounting and dismounting mechanism according to the one embodiment of the present invention, comprises: a tubular member inserted externally on the power transmission shaft so as to extend from the inner joint member; a fixing member received in the tubular member so as to be movable in a radial direction; and an annular member arranged on an outer periphery of the tubular member so as to be movable in an axial direction, and the fixing member in the tubular member is moved in the radial direction along with movement of the annular member in the axial direction so that the fixing member is mountable to and dismountable from the power transmission shaft.

In the present invention, fixation and separation of the power transmission shaft and the inner joint member are performed in the following manner by the mounting and dismounting mechanism comprising the tubular member, the fixing member and the annular member in the manner described below. The fixation and the separation of the power transmission shaft and the inner joint member are performed by the fixing member in the tubular member provided so as to extend from the inner joint member.

The fixation of the power transmission shaft and the inner joint member is performed as follows. The annular member is moved in a direction of approaching the fixing member in the tubular member. Through the approaching movement of the annular member, the fixing member is moved to the radially inner side in the tubular member. At this time, movement of the fixing member to the radially outer side is constrained by the annular member. With this, the fixing member protrudes from the inner peripheral surface of the tubular member. Through the protrusion of the fixing member, the fixing member is locked to the power transmission shaft.

The separation of the power transmission shaft and the inner joint member is as follows. The annular member is moved in a direction of separating from the fixing member in the tubular member. Through the separating movement of the annular member, the state in which the movement of the fixing member to the radially outer side is constrained is canceled so that the fixing member is movable to the radially outer side. Along with an operation of removing the power transmission shaft from the inner joint member, the fixing member is moved to the radially outer side to retreat from the inner peripheral surface of the tubular member. Through the retreat of the fixing member, the locked state of the fixing member to the power transmission shaft is canceled.

According to at least one embodiment of the present invention, it is desired that, in the mounting and dismounting mechanism, a locking groove be formed at any one of an end portion of the inner joint member and an end portion of the tubular member, and a locking claw be formed on another one of the end portion of the inner joint member and the end portion of the tubular member, and the locking claw be fitted to the locking groove so that the inner joint member and the tubular member are coupled to each other.

Through employment of such a structure, the tubular member can be provided as a separate member from the inner joint member being a component of the constant velocity universal joint. Thus, the tubular member can easily be manufactured.

According to at least one embodiment of the present invention, it is desired that the tubular member of the mounting and dismounting mechanism comprise a plurality of divided members divided in a circumferential direction.

Through employment of the structure in which the tubular member comprises the plurality of divided members divided in the circumferential direction as described above, the tubular member is easily assembled to the inner joint member.

According to at least one embodiment of the present invention, it is desired that, in the mounting and dismounting mechanism, an annular recessed groove be formed in an outer peripheral surface of the power transmission shaft so that the recessed groove of the power transmission shaft and the fixing member in the tubular member are allowed to be coupled to and separated from each other.

Through employment of the structure in which the annular recessed groove is formed in the outer peripheral surface of the power transmission shaft as described above, the fixing member is fitted to the recessed groove of the power transmission shaft at the time of fixing the power transmission shaft and the inner joint member so that the fixing member can be reliably locked to the power transmission shaft. Further, the fixing member is separated away from the recessed groove of the power transmission shaft at the time of separating the power transmission shaft and the inner joint member so that the fixing member can be positively separated from the power transmission shaft.

According to at least one embodiment of the present invention, it is desired that, in the mounting and dismounting mechanism, through holes be formed at a plurality of positions of the tubular member in the circumferential direction so as to be opened to inner peripheries and outer peripheries of the tubular member, and the fixing member having a spherical shape be arranged in each of the through holes so that the fixing member is allowed to freely protrude and retreat with respect to an opening on an inner peripheral side and an opening on an outer peripheral side of the each of the through holes.

Through employment of the structure in which the fixing member having a spherical shape is arranged in each of the through holes of the tubular member as described above, at the time of fixing the power transmission shaft and the inner joint member, through movement of the fixing member to the radially inner side, the fixing member protrudes from the inner peripheral surface of the tubular member so that the fixing member can easily be locked to the power transmission shaft. Further, at the time of separating the power transmission shaft and the inner joint member, through movement of the fixing member to the radially outer side, the fixing member retreats from the inner peripheral surface of the tubular member so that the fixing member is easily separated from the power transmission shaft.

According to at least one embodiment of the present invention, it is desired that, in the mounting and dismounting mechanism, at least one of the opening on the inner peripheral side and the opening on the outer peripheral side of the each of the through holes of the tubular member be reduced in diameter so as to have an inner diameter smaller than an outer diameter of the fixing member.

Through employment of the structure in which at least one of the opening on the inner peripheral side and the opening on the outer peripheral side of the each of the through holes of the tubular member is reduced in diameter as described above, at the time of assembling the annular member to the tubular member, the fixing member received in each of the through holes of the tubular member can be prevented from dropping off to the inner peripheral side or the outer peripheral side of the tubular member.

According to at least one embodiment of the present invention, it is desired that, in the mounting and dismounting mechanism, the annular member be mounted to an end portion of a boot configured to close an opening of the outer joint member.

Through employment of such a structure, the annular member has a seal function of preventing leakage of lubricant sealed inside the joint and entry of foreign matters from outside the joint, which is exerted by the boot, and a mounting/removing function of fixing and separating the power transmission shaft and the inner joint member, which is exerted by the mounting and dismounting mechanism.

According to at least one embodiment of the present invention, it is desired that, in the mounting and dismounting mechanism, a seal portion bonded to an inner peripheral surface of the annular member through vulcanization be formed, and the seal portion be fitted to an annular recess formed in the power transmission shaft through concavo-convex fitting.

Through employment of such structure, the sealing property can be ensured, and a position of the annular member in the axial direction with respect to the power transmission shaft can be regulated.

According to at least one embodiment of the present invention, it is desired that, in the mounting and dismounting mechanism, an annular recessed groove be formed in the outer peripheral surface of the power transmission shaft, and a seal member held in abutment against an end portion of the annular member be fitted to the recessed groove.

Through employment of the structure in which the seal member held in abutment against the end portion of the annular member is fitted to the recessed groove of the power transmission shaft as described above, the sealing property can be ensured, and movement of the annular member in the axial direction with respect to the power transmission shaft can be regulated.

Advantageous Effects of Invention

According to at least one embodiments of the present invention, the mounting and dismounting mechanism, which is configured to mount and dismount the power transmission shaft to and from the inner joint member, comprises the tubular member, the fixing member, and the annular member. Thus, the inner joint member and the power transmission shaft can reliably be fixed to each other and can easily be separated from each other with a simple structure. As a result, the degree of freedom in design of the mounting and dismounting mechanism can be enhanced, and the constant velocity universal joint can be reduced in cost without increasing the number of components.

BRIEF DESCRIPTION OF DRAWINGS

FIG. 17 is a sectional view for illustrating an overall configuration of a constant velocity universal joint according to yet another embodiment of the present invention.

DESCRIPTION OF EMBODIMENTS

Now, a constant velocity universal joint according to an embodiment of the present invention is described in detail with reference to the drawings.

In the embodiment described below, a Rzeppa type constant velocity universal joint (BJ) being one of fixed type constant velocity universal joints to be mounted to a propeller shaft for an automobile is exemplified. However, the present invention is also applicable to an undercut-free type constant velocity universal joint (UJ) being another one of the fixed type constant velocity universal joints. Further, the present invention is also applicable to a plunging type constant velocity universal joint such as a double-offset type constant velocity universal joint (DOJ), a cross-groove type constant velocity universal joint (LJ), or a tripod type constant velocity universal joint (TJ).

It is required that a propeller shaft to be mounted to an automobile such as a 4WD vehicle or a FR vehicle be adaptable to angular displacement and axial displacement caused by a change in relative positional relationship between a transmission and a differential. Therefore, in general, the propeller shaft has the following structure. Specifically, the fixed type constant velocity universal joint which allows only the angular displacement is installed on the transmission side, and the plunging type constant velocity universal joint which allows both the axial displacement and the angular displacement is installed on the differential side. Both the constant velocity universal joints are coupled to each other through intermediation of the propeller shaft made of steel.

Figure 1:
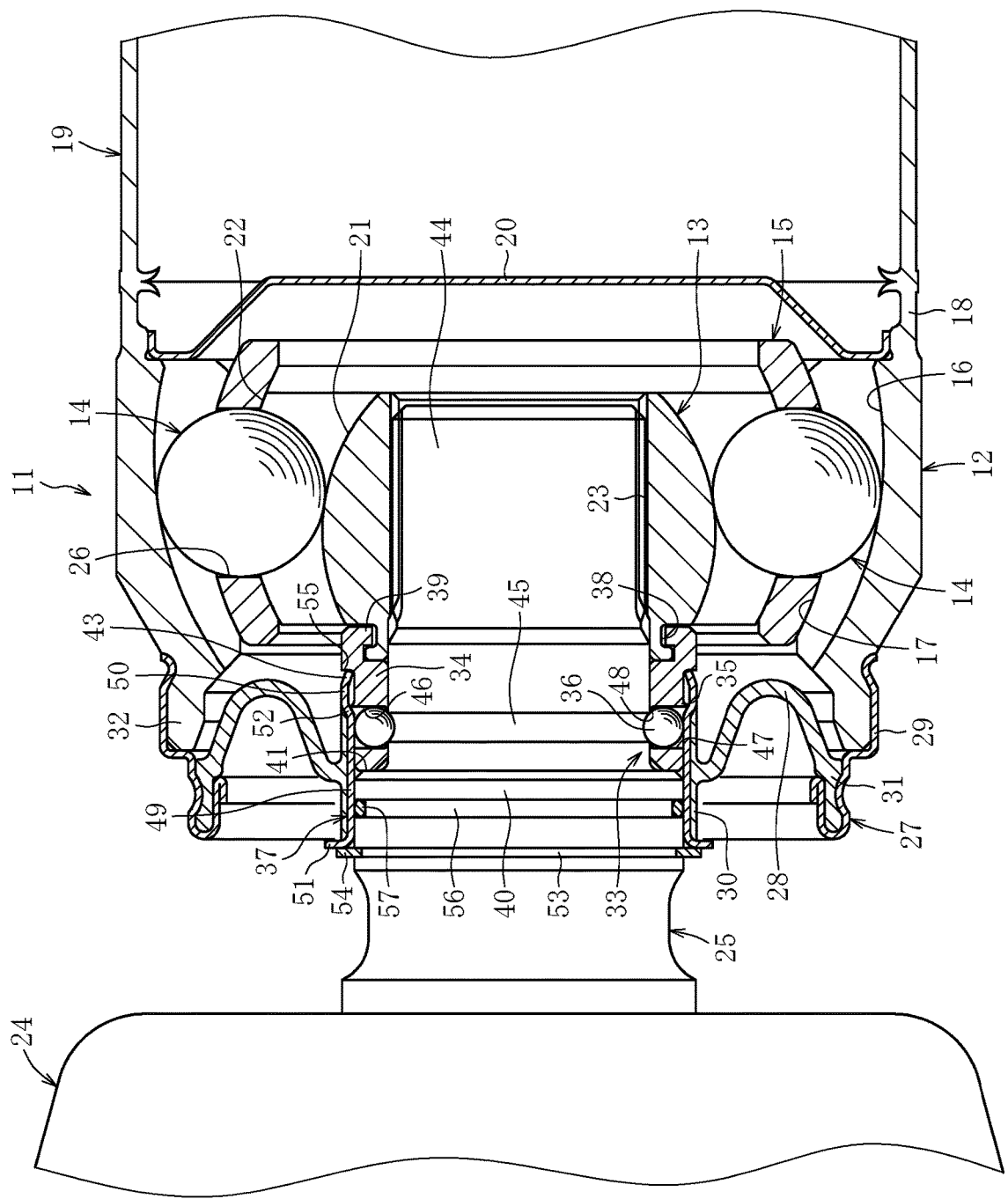
FIG. 1 is a sectional view for illustrating an overall configuration of a constant velocity universal joint according to an embodiment of the present invention.

As illustrated in FIG. 1, a fixed type constant velocity universal joint 11 according to this embodiment (hereinafter simply referred to as "constant velocity universal joint")

mainly comprises an outer joint member 12, an inner joint member 13, a plurality of balls 14 being torque transmission members, and a cage 15.

The outer joint member 12 has arc-shaped track grooves 16. The arc-shaped track grooves 16 extend in an axial direction, and are formed equiangularly at a plurality of positions in a spherical inner peripheral surface 17. A tubular propeller shaft 19 is coaxially coupled to one opening end portion 18 of the outer joint member 12 by friction welding or the like so as to allow torque transmission therebetween. Further, a seal plate 20 is mounted to the opening end portion 18 through press fitting so as to seal lubricant such as grease inside the outer joint member 12.

The inner joint member 13 has arc-shaped track grooves 21. The arc-shaped track grooves 21 extend in an axial direction so as to be paired with the track grooves 16 of the outer joint member 12, and are formed equiangularly at a plurality of positions in a spherical outer peripheral surface 22. A power transmission shaft 25 being an output shaft extending from a transmission 24 is coupled to a shaft hole 23 of the inner joint member 13 by spline fitting so as to allow torque transmission therebetween. The power transmission shaft 25 is mountable to and dismountable from the inner joint member 13 by a mounting and dismounting mechanism 33.

The balls 14 are interposed between the track grooves 16 of the outer joint member 12 and the track grooves 21 of the inner joint member 13. The balls 14 are configured to transmit rotational torque between the outer joint member 12 and the inner joint member 13. The number of the balls 14 may be six, eight, or other numbers, and may suitably be set.

The cage 15 is interposed between the inner peripheral surface 17 of the outer joint member 12 and the outer peripheral surface 22 of the inner joint member 13. The cage 15 has a plurality of pockets 26. The pockets 26 are configured to retain the balls 14, and are formed equiangularly at a plurality of positions in the cage 15.

In the constant velocity universal joint 11 having the above-mentioned configuration, when an operating angle is formed by the propeller shaft 19 between the outer joint member 12 and the inner joint member 13, the balls 14 retained in the cage 15 are always maintained within a plane obtained by bisection of the operating angle at any operating angle. Accordingly, constant velocity is secured between the outer joint member 12 and the inner joint member 13. Rotational torque is transmitted between the outer joint member 12 and the inner joint member 13 through intermediation of the balls 14 under the state in which the constant velocity is secured therebetween.

The constant velocity universal joint 11 has a structure in which a seal mechanism 27 is mounted between the outer joint member 12 and the power transmission shaft 25 in order to prevent leakage of the lubricant sealed inside the outer joint member 12 and entry of foreign matters from an outside. The lubricant is sealed in the internal space of the outer joint member 12. With this, the lubricity at a sliding portion inside the joint is ensured at the time of an operation during which the power transmission shaft 25 is rotated while forming an operating angle with respect to the outer joint member 12.

The constant velocity universal joint 11 for a propeller shaft is high in rotation speed and small in operating angle. Thus, the above-mentioned seal mechanism 27 comprises a boot 28 made of rubber, a metal ring 29, and an annular member 37.

The boot 28 comprises a small-diameter end portion 30 and a large-diameter end portion 31, and has a shape of being folded back at the middle into a U-shape. One end portion of the metal ring 29 is fixed to an outer peripheral surface of an opening end portion 32 of the outer joint member 12 by press fitting, and another end portion thereof is fixed to the large-diameter end portion 31 of the boot 28 by caulking. The small-diameter end portion 30 of the boot 28 is integrally fixed to the annular member 37 by vulcanization bonding. The annular member 37 forms a part of the seal mechanism 27, and forms a part of the mounting and dismounting mechanism 33.

In the propeller shaft in which the constant velocity universal joint 11 is assembled to the propeller shaft 19, in order to perform component replacement or maintenance and inspection for a propeller shaft, it is required to provide the mounting and dismounting mechanism 33 for mounting and removing the constant velocity universal joint 11 to and from the power transmission shaft 25 of the transmission 24. The constant velocity universal joint according to this embodiment comprises the mounting and dismounting mechanism 33 having the structure as described below.

Figure 2:
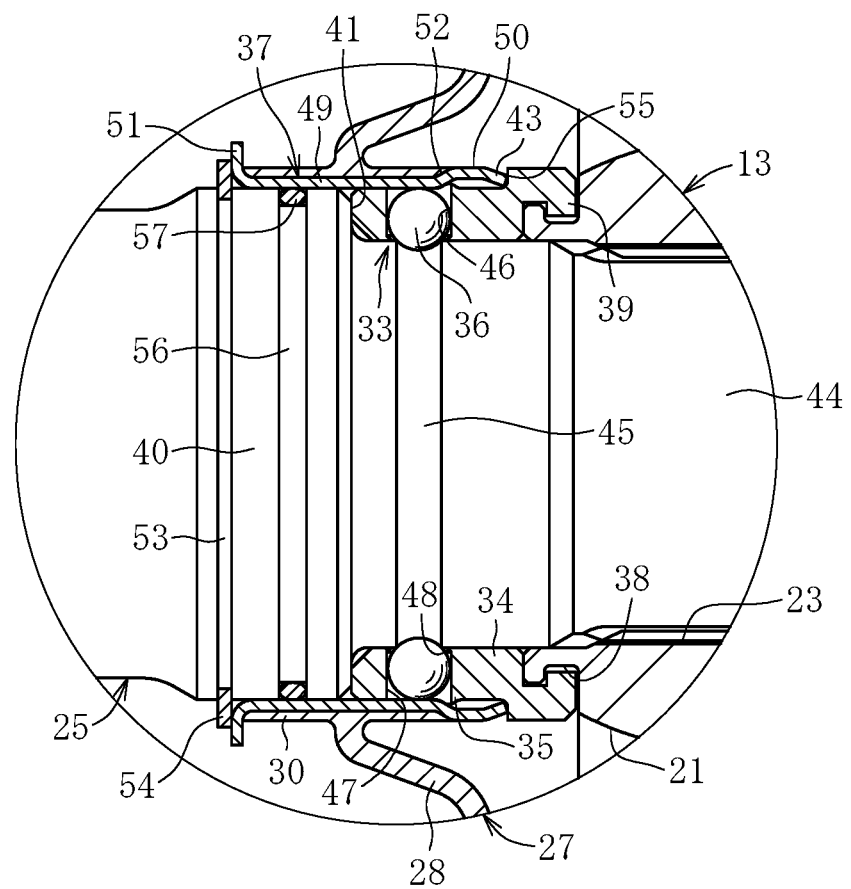
FIG. 2 is an enlarged sectional view of a main part of FIG. 1.

As illustrated in FIG. 1 and FIG. 2, the mounting and dismounting mechanism 33 is provided between the inner joint member 13 of the constant velocity universal joint 11 and the power transmission shaft 25 of the transmission 24, and mainly comprises a tubular member 34, fixing members 36, and the annular member 37.

The tubular member 34 is inserted externally on the power transmission shaft 25 in the axial direction so as to extend to the transmission 24 side of the inner joint member 13. An annular locking groove 38 is formed in an outer peripheral surface of a projecting end portion of the inner joint member 13, which is located on the transmission 24 side, and an annular locking claw 39 is formed on an inner peripheral surface of an end portion of the tubular member 34, which is located on the propeller shaft 19 side.

The locking claw 39 of the tubular member 34 is fitted to the locking groove 38 of the inner joint member 13. In this manner, the inner joint member 13 and the tubular member 34 are coupled to each other. Under the state in which the tubular member 34 is coupled to the inner joint member 13, the tubular member 34 is regulated in position in the axial direction by a stepped surface 41 of a large-diameter portion 40 of the power transmission shaft 25.

The tubular member 34 has a slit (not shown) formed therein so as to be capable of being increased in diameter. When the tubular member 34 is to be assembled to the inner joint member 13, the tubular member 34 is increased in diameter using the slit so that the locking claw 39 of the tubular member 34 and the locking groove 38 of the inner joint member 13 are easily fitted to each other. Even when such slit is formed, an outer periphery of the tubular member 34 after the assembly is constrained by the annular member 37. Thus, the tubular member 34 is not unnecessarily increased in diameter.

In this embodiment, the tubular member 34 being a separate member from the inner joint member 13 being a component of the constant velocity universal joint 11 is exemplified. However, the tubular member 34 may be formed integrally with the inner joint member 13. When the tubular member 34 is formed as a separate member from the inner joint member 13, the tubular member 34 is easily manufactured in terms of ease of processing.

As the material of the tubular member 34, there is given, for example, low-carbon steel, brass, aluminum, or resin, and the material of the tubular member 34 is not limited as long as the material has required durability against a force in the axial direction (for example, about 2,000 N at the maximum) and does not cause deformation or breakage of the locking claw 39.

A hooking portion 35 that protrudes to the radially outer side is formed on an outer peripheral surface of the tubular member 34. With this, at the time of assembling the annular member 37 to the tubular member 34, the hooking portion 35 interferes with an end portion 43 on the propeller shaft side of the annular member 37 (see FIG. 4), thereby being capable of preventing the annular member 37 from dropping off the tubular member 34.

Through holes 46 that are opened to the inner and outer peripheries of the tubular member 34 are formed at a plurality of positions (four positions at an interval angle of 90°) of the tubular member 34 in the circumferential direction, and the spherical fixing members 36 are received in the through holes 46 so as to be movable in the radial direction. Through movement of the fixing members 36 in the radial direction, the fixing members 36 are allowed to freely protrude and retreat with respect to opening portions 47 on the outer peripheral side and opening portions 48 on the inner peripheral side of the through holes 46 of the tubular member 34.

In this embodiment, as the fixing members 36, a plurality of (four) spherical bodies (steel balls) are exemplified. In the drawings, the fixing members 36 are arranged at two upper and lower positions on sides opposite to each other by 180°. The number of the fixing members 36 may be appropriately set in accordance with a fixing force required for locking the tubular member 34 to the power transmission shaft 25.

As described above, the spherical fixing members 36 are received in the through holes 46 of the tubular member 34. Thus, at the time of fixing the power transmission shaft 25 and the inner joint member 13, through movement of the fixing members 36 to the radially inner side, the power transmission shaft 25 is easily constrained by the fixing members 36. Further, at the time of separating the power transmission shaft 25 and the inner joint member 13, through movement of the fixing members 36 to the radially outer side, the constraining of the power transmission shaft 25 by the fixing members 36 is easily canceled.

Each of the through holes 46 of the tubular member 34 is reduced in diameter at each of the opening portions 48 on the inner peripheral side so as to have an inner diameter slightly smaller than an outer diameter of each of the fixing members 3. With this, at the time of assembling the annular member 37 to the tubular member 34 (in a state in which the power transmission shaft 25 is not inserted into the tubular member 34), the fixing members 36 received in the through holes 46 of the tubular member 34 are prevented from dropping off to the radially inner side of the tubular member 34 due to the gravity or the like (see FIG. 4).

Meanwhile, an annular recessed groove 45 is formed in an outer peripheral surface between a spline fitting portion 44 and the large-diameter portion 40 of the power transmission shaft 25. The recessed groove 45 is formed so as to match with positions of the through holes 46 formed in the tubular member 34 in the axial direction under a state in which the tubular member 34 is held in abutment against the stepped surface 41 of the large-diameter portion 40 of the power transmission shaft 25. In this state, the fixing members 36 are fitted to the recessed groove 45. In this manner, the fixing members 36 are locked to the power transmission shaft 25.

As illustrated in FIG. 1 and FIG. 2, the annular member 37 is arranged so as to be movable in the axial direction along an outer peripheral surface of the large-diameter portion 40 of the power transmission shaft 25 and the outer peripheral surface of the tubular member 34. The annular member 37 is integrally mounted to the small-diameter end portion 30 of the boot 28 forming part of the above-mentioned seal mechanism 27 through vulcanization bonding.

The annular member 37 has a tubular shape elongated in the axial direction, and comprises a small-diameter cylindrical portion 49 and a large-diameter cylindrical portion 50. The small-diameter cylindrical portion 49 is located on the transmission 24 side, and is held in slide contact with the outer peripheral surface of the large-diameter portion 40 of the power transmission shaft 25 and the outer peripheral surface of the tubular member 34. The large-diameter cylindrical portion 50 is located on the propeller shaft 19 side, and has a gap with the outer peripheral surface of the tubular member 34.

An end portion 51 on the transmission side of the small-diameter cylindrical portion 49 is bent to the radially outer side. The small-diameter cylindrical portion 49 constrains movement of the fixing members 36 to the radially outer side under the state in which the fixing members 36 are received in the through holes 46 of the tubular member 34 so that the fixing members 36 are protruded from an inner peripheral surface of the tubular member 34.

A diameter increasing portion 52 inclined in a tapered shape from the small-diameter cylindrical portion 49 to the large-diameter cylindrical portion 50 is formed between the small-diameter cylindrical portion 49 and the large-diameter cylindrical portion 50. At the time of fixing the power transmission shaft 25 and the inner joint member 13, through movement of the annular member 37 in the axial direction, the fixing members 36 can be smoothly moved to the radially inner side along the diameter increasing portion 52.

At the time of separating the power transmission shaft 25 and the inner joint member 13, the large-diameter cylindrical portion 50 receives the fixing members 36 that are canceled from the state in which the movement to the radially outer side is constrained. With this, the fixing members 36 are prevented from dropping off the through holes 46 of the tubular member 34 to the radially outer side.

Further, the end portion 43 on the propeller shaft side of the large-diameter cylindrical portion 50 is reduced in diameter to be bent to the radially inner side. An inner diameter at the end portion 43 on the propeller shaft side, which is reduced in diameter from the large-diameter cylindrical portion 50, is set larger than an outer diameter of the tubular member 34, and is set smaller than an outer diameter of the hooking portion 35 formed on the outer peripheral surface of the tubular member 34.

With this, the annular member 37 can be moved smoothly in the axial direction with respect to the tubular member 34, and, at the time of the movement of the annular member 37 in the axial direction, the end portion 43 on the propeller shaft side interferes with the hooking portion 35, thereby preventing the annular member 37 from being removed from the tubular member 34.

The size of each of the fixing members 36 is set so that, under the state in which the movement of the fixing members 36 to the radially outer side is constrained by the small-diameter cylindrical portion 49 of the annular member 37, the fixing members 36 protrude from the inner peripheral surface of the tubular member 34, and, when the state in which the movement of the fixing members 36 to the radially outer side is constrained by the small-diameter cylindrical portion 49 of the annular member 37 is canceled, the fixing members 36 are received in the large-diameter cylindrical portion 50 of the annular member 37, and are prevented from protruding from the inner peripheral surface of the tubular member 34.

That is, the outer diameter of each of the spherical fixing members 36 is required to be set larger than a radial dimension of each of the through holes 46 of the tubular member 34 (depth dimension of each of the through holes). With this, the fixing members 36 can be locked to and separated from the power transmission shaft 25 reliably.

Meanwhile, an annular recessed groove 53 is formed on the transmission side on the outer peripheral surface of the large-diameter portion 40 of the power transmission shaft 25, and a snap ring 54 is fitted to the recessed groove 53.

With this, the end portion 43 on the propeller shaft side of the annular member 37 is locked to a stepped portion 55 on the outer peripheral surface of the tubular member 34, and the end portion 51 on the transmission side of the annular member 37 is locked to the snap ring 54. In this manner, the annular member 37 is regulated in position in both sides of the axial direction with respect to the power transmission shaft 25 and the tubular member 34.

Further, an annular recessed groove 56 is formed on the propeller shaft side on the outer peripheral surface of the large-diameter portion 40 of the power transmission shaft 25, and an O-ring 57 is fitted to the recessed groove 56. Through intermediation of the O-ring 57, the annular member 37 is externally fitted to the outer peripheral surface of the large-diameter portion 40 of the power transmission shaft 25 and the outer peripheral surface of the tubular member 34.

With this, the annular member 37 not only has a mounting/removing function of fixing and separating the power transmission shaft 25 and the inner joint member 13, which is exerted by the mounting and dismounting mechanism 33, but also has a seal function of preventing leakage of lubricant sealed inside the joint and preventing entry of foreign matters from outside the joint, which is exerted by the boot 28 of the seal mechanism 27.

In the mounting and dismounting mechanism 33 having the above-mentioned configuration, along with movement of the annular member 37 in the axial direction, the fixing members 36 exposed from the inner side of the tubular member 34 are moved in the radial direction. In this manner, the fixing member 36 is mountable to and dismountable from the power transmission shaft 25.

That is, in the constant velocity universal joint 11 according to this embodiment, by the mounting and dismounting mechanism 33 comprising the tubular member 34, the fixing members 36, and the annular member 37, fixation and separation of the power transmission shaft 25 and the inner joint member 13 are performed in the manner described below with reference to FIG. 4 to FIG. 7. FIG. 4 to FIG. 7 are each an illustration of a state in which the fixing members 36 are under the gravity from the upper side to the lower side.

Figure 3:
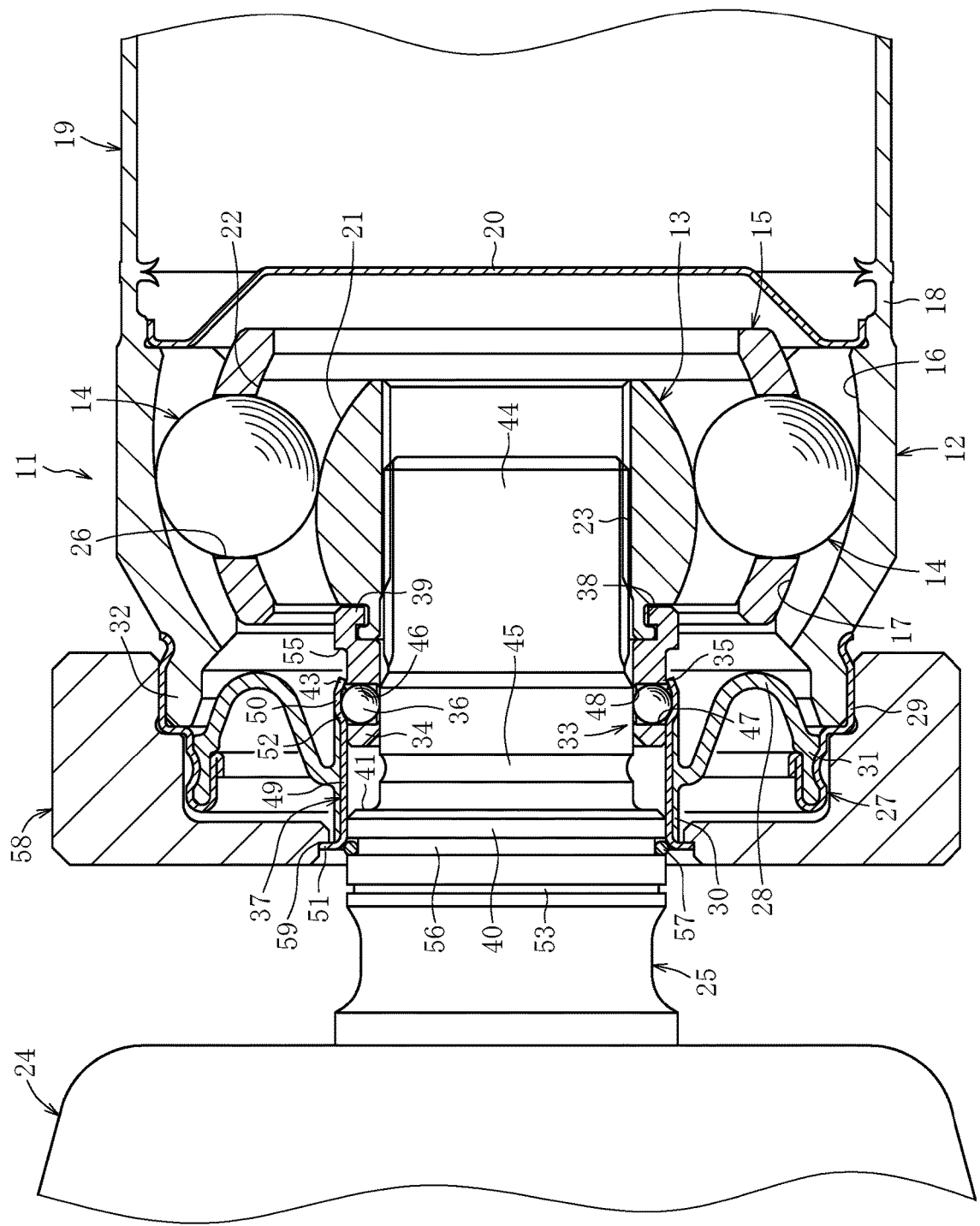
FIG. 3 is a sectional view for illustrating a state at the time when an inner joint member of the constant velocity universal joint is assembled to a power transmission shaft of a transmission.
Figure 4:
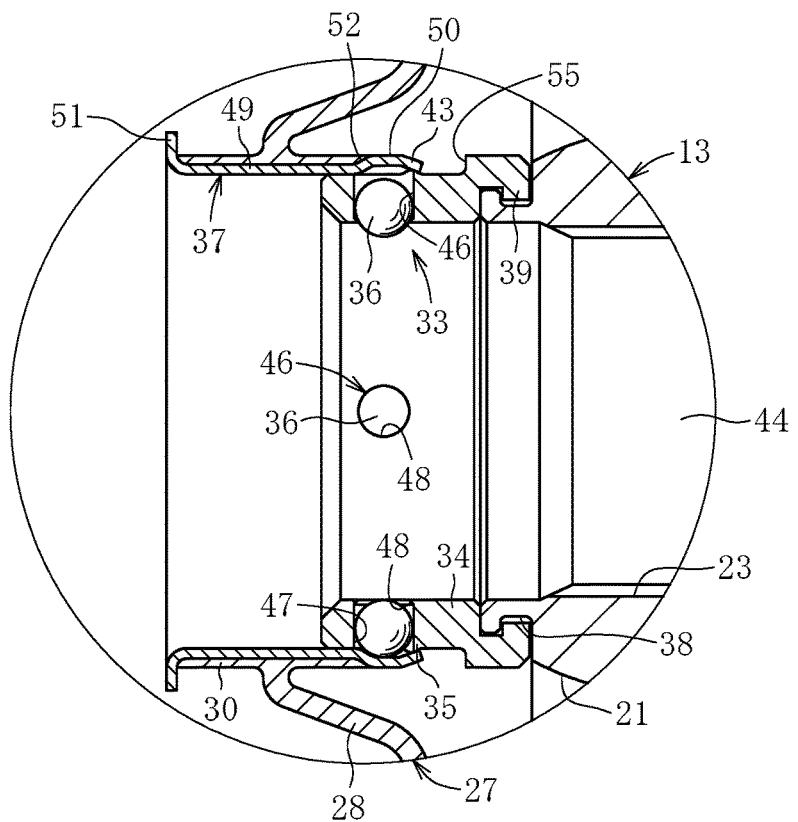
FIG. 4 is a sectional view for illustrating a state before the power transmission shaft is inserted into the inner joint member in a mounting and dismounting mechanism of FIG. 2.
Figure 5:
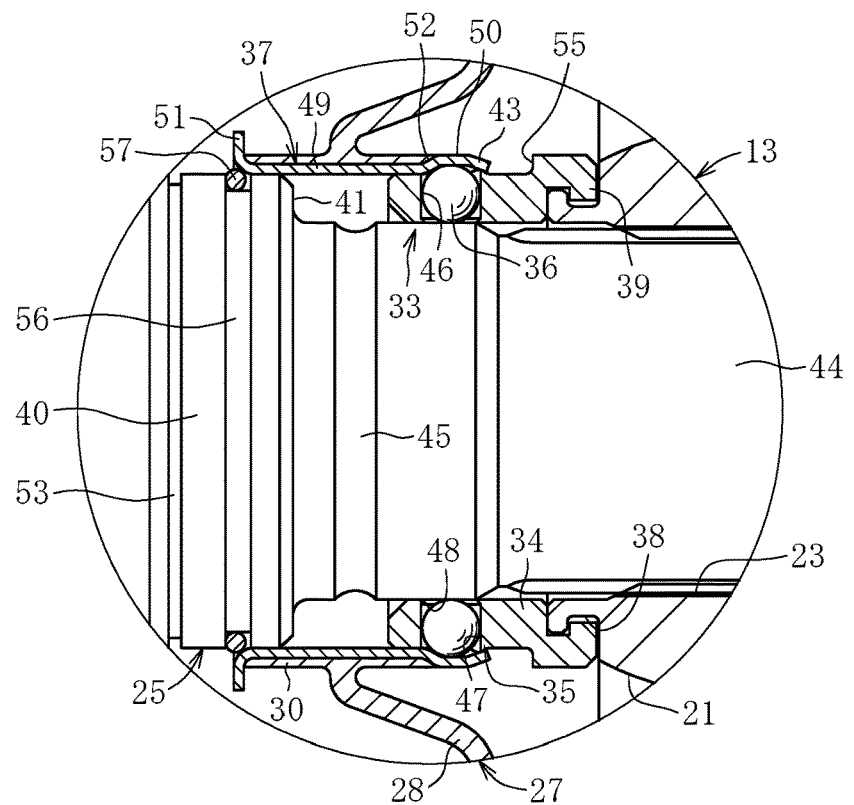
FIG. 5 is a sectional view for illustrating a state in which the power transmission shaft is under being inserted into the inner joint member in the mounting and dismounting mechanism of FIG. 2.
Figure 6:
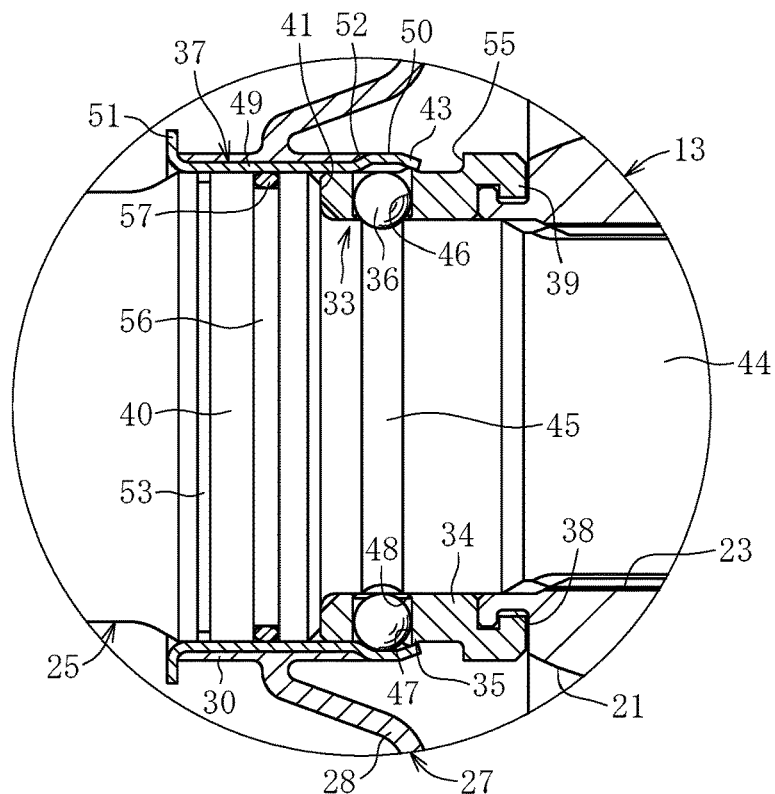
FIG. 6 is a sectional view for illustrating a state in which the insertion of the power transmission shaft into the inner joint member is completed in the mounting and dismounting mechanism of FIG. 2.
Figure 7:
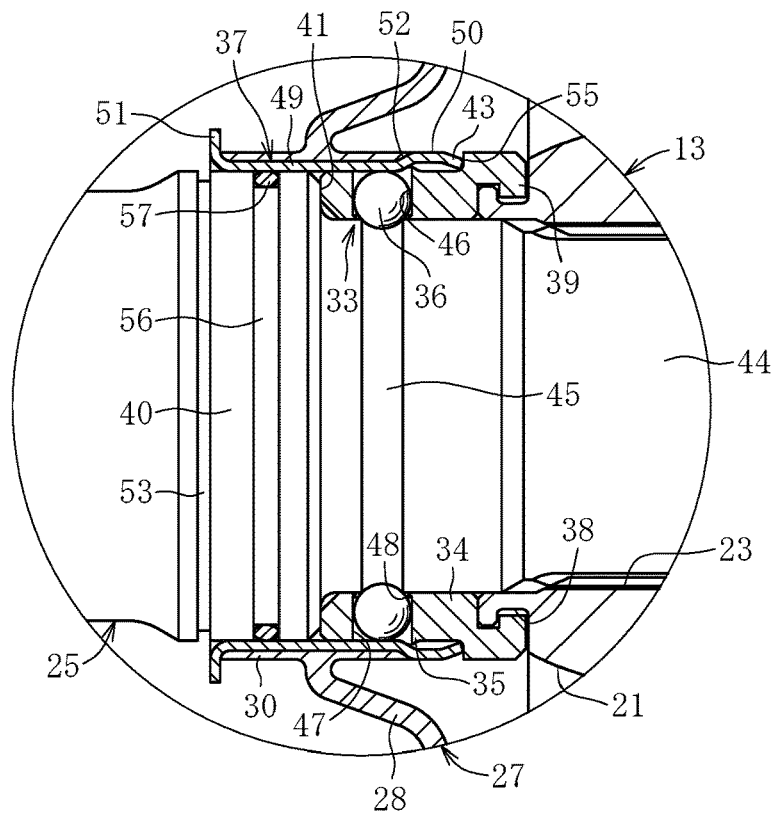
FIG. 7 is a sectional view for illustrating a state after the power transmission shaft is fixed to the inner joint member in the mounting and dismounting mechanism of FIG. 2.

FIG. 4 is an illustration of a state before the power transmission shaft 25 is inserted into the inner joint member 13. FIG. 5 is an illustration of a state in which the power transmission shaft 25 is under being inserted into the inner joint member 13 (see FIG. 3). FIG. 6 is an illustration of a state in which the insertion of the power transmission shaft 25 to the inner joint member 13 is completed. FIG. 7 is an illustration of a state after the power transmission shaft 25 is fixed to the inner joint member 13 (state before the snap ring 54 illustrated in FIG. 1 and FIG. 2 is mounted).

First, prior to assembly of the inner joint member 13 of the constant velocity universal joint 11 to the power transmission shaft 25 of the transmission 24, as illustrated in FIG. 4, the locking claw 39 of the tubular member 34 is fitted to the locking groove 38 of the inner joint member 13. In this manner, the tubular member 34 is assembled to the inner joint member 13. The annular member 37 is inserted externally on the outer peripheral surface of the tubular member 34. After that, the fixing members 36 are arranged in the through holes 46 of the tubular member 34, and the annular member 37 is inserted externally on the outer peripheral surface of the tubular member 34. At this time, the end portion 43 on the propeller shaft side of the annular member 37 is inserted until the end portion 43 on the propeller shaft side exceeds the hooking portion 35 of the tubular member 34.

In this state, the large-diameter cylindrical portion 50 of the annular member 37 is arranged so as to close the opening portions 47 on the outer peripheral side of the through holes 46 of the tubular member 34. Further, the opening portions 48 on the inner peripheral side of the through holes 46 of the tubular member 34 are reduced in diameter. Thus, the fixing members 36 received in the through holes 46 do not drop off the opening portions 48 on the inner peripheral side of the through holes 46. At this time, the end portion 43 on the propeller shaft side of the annular member 37 is locked to the hooking portion 35 of the tubular member 34, thereby retaining the annular member 37 with respect to the tubular member 34.

Next, when the inner joint member 13 is to be assembled to the power transmission shaft 25, as illustrated in FIG. 5, the power transmission shaft 25 is inserted into the shaft hole 23 of the inner joint member 13, and the inner joint member 13 and the power transmission shaft 25 are coupled to each other so as to allow torque transmission therebetween by spline fitting. At this time, the power transmission shaft 25 is inserted into the tubular member 34 at an end portion on the transmission side thereof until the stepped surface 41 of the large-diameter portion 40 of the power transmission shaft 25 is brought into abutment against the tubular member 34.

As illustrated in FIG. 3, at the time of insertion of the power transmission shaft 25, a jig 58 mounted to the metal ring 29 of the seal mechanism 27 is used. The jig 58 comprises a locking portion 59 configured to regulate movement of the annular member 37 of the mounting and dismounting mechanism 33 in the axial direction. The locking portion 59 is brought into abutment against the inner side of the end portion 51 on the transmission side of the annular member 37, thereby positioning the annular member 37 with respect to the tubular member 34 so that the large-diameter cylindrical portion 50 of the annular member 37 closes the opening portions 47 on the outer peripheral side of the through holes 46 of the tubular member 34.

After the completion of the insertion of the power transmission shaft 25, the jig 58 is removed. The above-mentioned jig 58 is not necessarily required as long as the fixed state of the annular member 37 is maintained.

Through use of such jig 58, movement of the annular member 37 in the axial direction along with the insertion of the power transmission shaft 25 is restricted, and the annular member 37 can be positioned so that the large-diameter cylindrical portion 50 of the annular member 37 corresponds to the opening portions 47 on the outer peripheral side of the through holes 46 of the tubular member 34.

With this, the fixing members 36 can be freely moved in the radial direction in the through holes 46 of the tubular member 34, and the fixing members 36 can be received in the large-diameter cylindrical portion 50 of the annular member 37. As a result, the fixing members 36 do not protrude from the opening portions 48 on the inner peripheral side of the through holes 46 of the tubular member 34, and thus, the insertion of the power transmission shaft 25 is not restricted. Therefore, the inner joint member 13 can easily be assembled to the power transmission shaft 25.

That is, as illustrated in FIG. 5, at the time of the insertion of the power transmission shaft 25, the large-diameter cylindrical portion 50 of the annular member 37 is arranged so as to correspond to the opening portions 47 on the outer peripheral side of the through holes 46 of the tubular member 34. Thus, the fixing members 36 can be freely moved in the radial direction in the through holes 46 of the tubular member 34. Accordingly, the fixing members 36 are pushed out to the radially outer side by the outer peripheral surface of the power transmission shaft 25 inserted into the tubular member 34.

With this, the fixing members 36 are received in the large-diameter cylindrical portion 50 of the annular member 37, and are prevented from protruding from the opening portions 48 on the inner peripheral side of the through holes 46 to the radially inner side. As a result, the power transmission shaft 25 is smoothly inserted into the tubular member 34.

Further, the power transmission shaft 25 is pushed so that, as illustrated in FIG. 6, the stepped surface 41 of the large-diameter portion 40 of the power transmission shaft 25 is brought into abutment against the end portion on the transmission side of the tubular member 34. With this, the recessed groove 45 located on the outer peripheral surface of the power transmission shaft 25 is arranged at a position corresponding to the fixing members 36 exposed from the opening portions 48 on the inner peripheral side of the through holes 46 of the tubular member 34. At this time, the fixing members 36 can be freely moved in the radial direction in the through holes 46 of the tubular member 34 between the recessed groove 45 of the power transmission shaft 25 and the large-diameter cylindrical portion 50 of the annular member 37.

Next, the annular member 37 is slide-moved in a direction of approaching the fixing members 36 (propeller shaft 19 side). As illustrated in FIG. 6, the fixing members 36 that protrude from the opening portions 47 on the outer peripheral side of the through holes 46 of the tubular member 34 are brought into abutment against the diameter increasing portion 52 of the annular member 37. When the annular member 37 is further slide-moved in the axial direction from this state, the annular member 37 moves the fixing members 36 by pushing the fixing members 36 to the radially inner side. At this time, the fixing members 36 are pushed smoothly along the diameter increasing portion 52 of the annular member 37.

Then, as illustrated in FIG. 7, through movement of the annular member 37 in the axial direction, the end portion 43 on the propeller shaft side is brought into abutment against the stepped portion 55 on the outer peripheral surface of the tubular member 34. Meanwhile, the movement of the fixing members 36 to the radially outer side is constrained by the small-diameter cylindrical portion 49 of the annular member 37. Thus, the fixing members 36 moved to the radially inner side in the through holes 46 of the tubular member 34 protrude from the opening portions 48 on the inner peripheral side of the through holes 46 to be fitted to the recessed groove 45 of the power transmission shaft 25. In this manner, the fixing members 36 pressed by the small-diameter cylindrical portion 49 of the annular member 37 are locked to the recessed groove 45 of the power transmission shaft 25.

The power transmission shaft 25 and the inner joint member 13 are fixed to each other by the fixing members 36 through intermediation of the tubular member 34. Then, the snap ring 54 is fitted to the recessed groove 53 of the power transmission shaft (see FIG. 2). In this manner, the fixation of the power transmission shaft 25 and the inner joint member 13 is completed.

Meanwhile, separation of the power transmission shaft 25 and the inner joint member 13 is performed through a procedure reverse to the procedure described above. That is, the snap ring 54 is removed from the recessed groove 53 of the power transmission shaft 25 (see FIG. 7). Then, the annular member 37 is slide-moved in a direction of separating from the fixing members 36 (to the transmission 24 side), and is arranged at such a position that the large-diameter cylindrical portion 50 of the annular member 37 corresponds to the through holes 46 of the tubular member 34 (see FIG. 6).

With this, the fixing members 36 can be freely moved in the radial direction in the through holes 46, and the state in which the fixing members 36 are locked to the power transmission shaft 25 is canceled. The spline fitting portion 44 of the power transmission shaft 25 is pulled out from the shaft hole 23 of the inner joint member 13 from the state. Then, the fixing members 36 retreat from the opening portions 48 on the inner peripheral side of the through holes 46 of the tubular member 34, and are released from the recessed groove 45 of the power transmission shaft 25 to be brought into abutment against the outer peripheral surface of the power transmission shaft 25 (see FIG. 5). Further, the power transmission shaft 25 is pulled out. In this manner, the separation of the power transmission shaft 25 and the inner joint member 13 is completed.

All of the components of the mounting and dismounting mechanism 33, which are used in the fixation and the separation of the power transmission shaft 25 and the inner joint member 13, that is, the tubular member 34, the fixing members 36, and the annular member 37 are not caused to be broken or significantly deformed, and hence repeated fixation and separation can be performed using the same components.

In the above-mentioned embodiment, the following structure is exemplified. Specifically, as the seal mechanism 27, the recessed groove 56 is formed in the outer peripheral surface of the large-diameter portion 40 of the power transmission shaft 25, and the O-ring 57 is fitted to the recessed groove 56 so that the inner peripheral surface of the annular member 37 is held in close contact with the O-ring 57. However, other structures may be employed.

Figure 8:
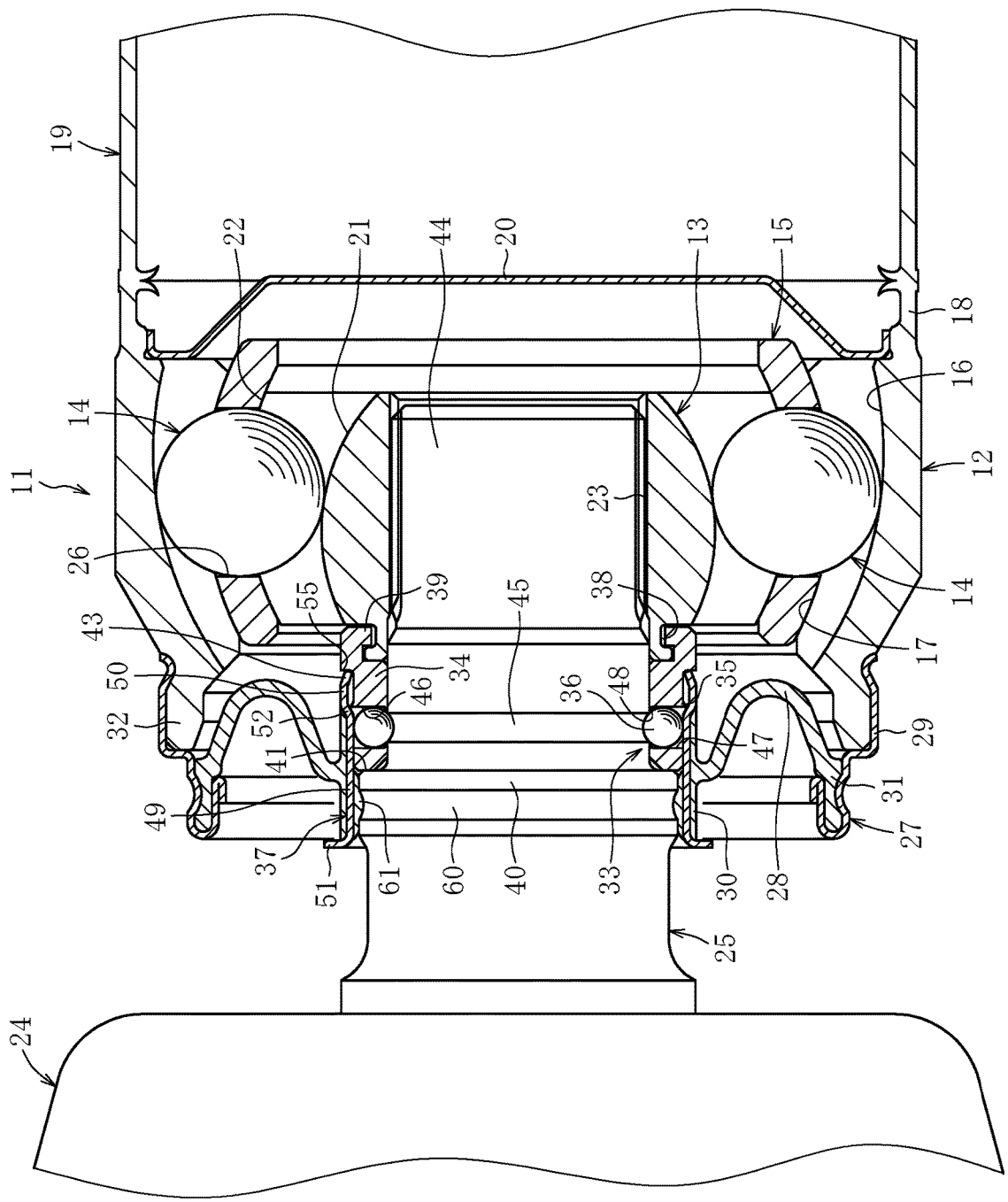
FIG. 8 is a sectional view for illustrating an overall configuration of a constant velocity universal joint according to another embodiment of the present invention.

For example, as illustrated in FIG. 8, an annular recess 60 is formed in the outer peripheral surface of the large-diameter portion 40 of the power transmission shaft 25, and, when the small-diameter end portion 30 of the boot 28 is to be bonded to the annular member 37 through vulcanization, a rubber member of the boot 28 is also bounded to the inner peripheral surface of the annular member 37 through vulcanization to form a seal portion 61.

The seal portion 61 is formed to have a projecting shape in conformity with the recessed shape of the recess 60 of the power transmission shaft 25. With this, the sealing property can be ensured, and the position of the annular member 37 in the axial direction with respect to the power transmission shaft 25 can be regulated.

As described above, through the projection and recess fitting of the seal portion 61 of the annular member 37 and the recess 60 of the power transmission shaft 25, the position of the annular member 37 in the axial direction can be regulated. However, as in the above-mentioned embodiment, the snap ring 54 may be fitted to the recessed groove 53 of the power transmission shaft 25, and a structure of locking the end portion 51 on the transmission side of the annular member 37 may be additionally provided to the snap ring 54. With this configuration, the position of the annular member 37 in the axial direction can reliably be regulated.

In the embodiments illustrated in FIG. 1 and FIG. 8, the tubular member 34 being an integrated component is exemplified. At the time of assembling the tubular member 34 to the inner joint member 13, the tubular member 34 is increased in diameter using the slit so that the locking claw 39 of the tubular member 34 and the locking groove 38 of the inner joint member 13 are fitted to each other.

In such tubular member 34 being an integrated component, rigidity is high depending on dimensions or a material (such as carbon steel or sintered metal) of the tubular member 34, and hence there are concerns that a large force is required for increase in diameter, and plastic deformation remains after the increase in diameter.

Figure 9:
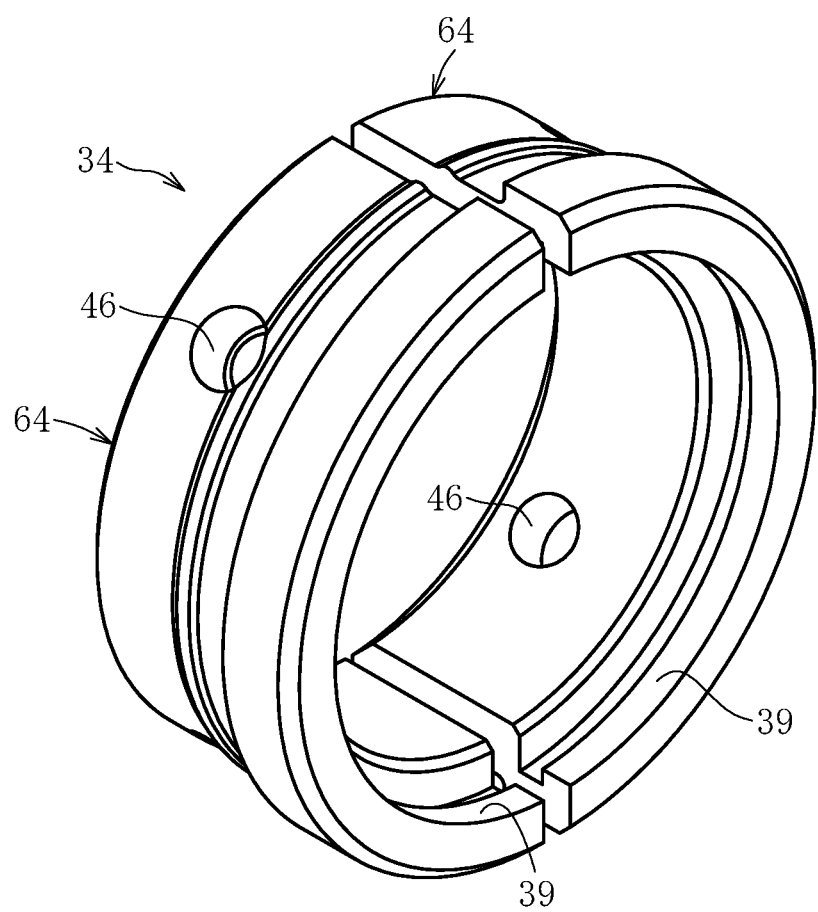
FIG. 9 is a perspective view for illustrating a tubular member having a divided structure in the mounting and dismounting mechanism of FIG. 1 and FIG. 8.

In view of this, the following structure is effective. Specifically, as in an embodiment illustrated in FIG. 9, the tubular member 34 comprises a plurality of (two in FIG. 9) divided members 64 divided in the circumferential direction. The number of the divided members 64 may be other than two, and the number may be freely selected.

With this structure, without increasing the diameter of the tubular member 34, the locking claw 39 of the tubular member 34 and the locking groove 38 of the inner joint member 13 can be fitted to each other (see FIG. 1 to FIG. 8). In this manner, the tubular member 34 can easily be assembled to the inner joint member 13.

In the divided structure of the tubular member 34, the divided members 64 of the tubular member 34 do not drop off the inner joint member 13 by assembling the tubular member 34 to the inner joint member 13 so that the fixing members 36 are received in the through holes 46, and then, inserting the annular member 37 externally on the tubular member 34.

Figure 10:
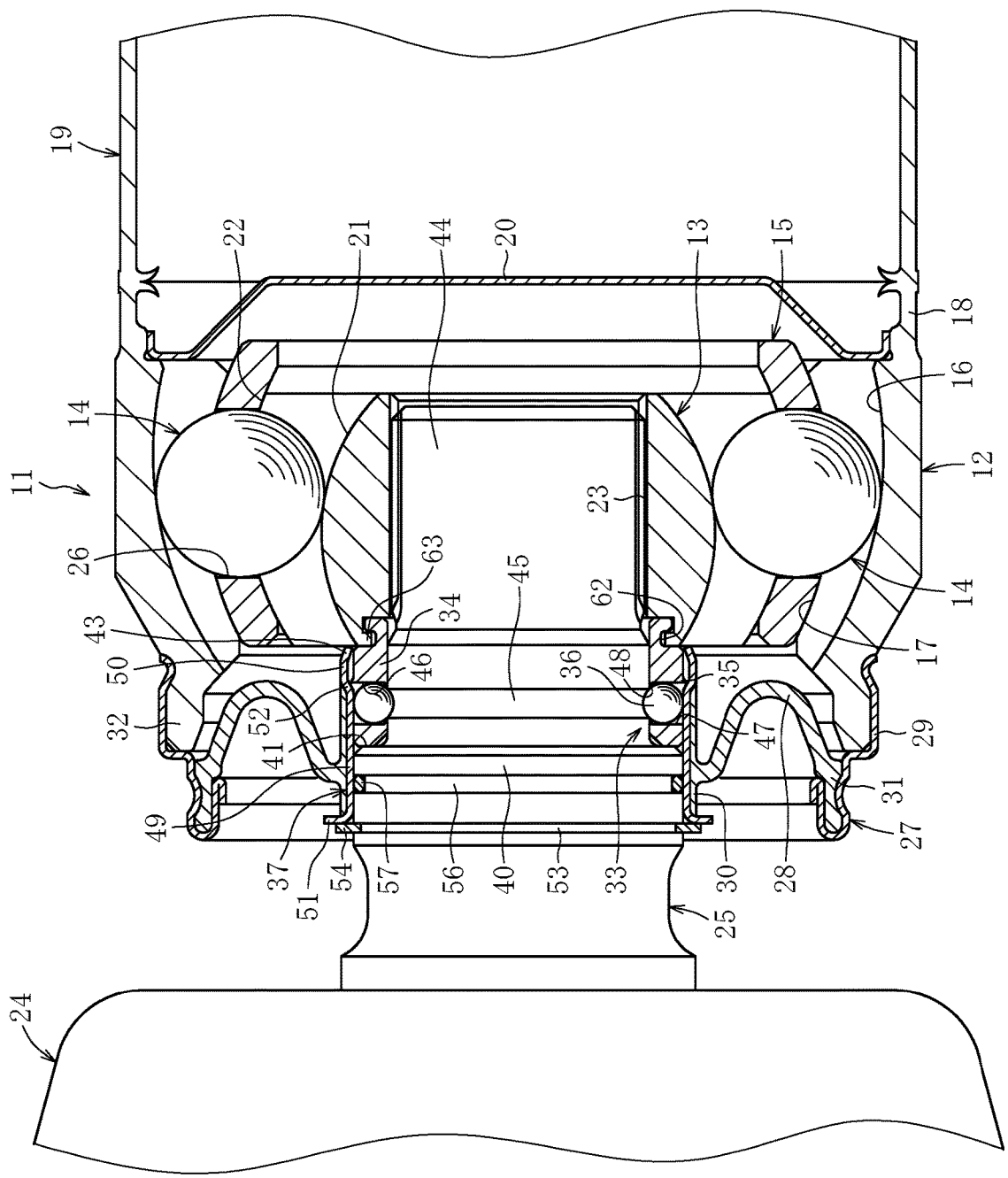
FIG. 10 is a sectional view for illustrating an overall configuration of a constant velocity universal joint according to still another embodiment of the present invention.
Figure 11:
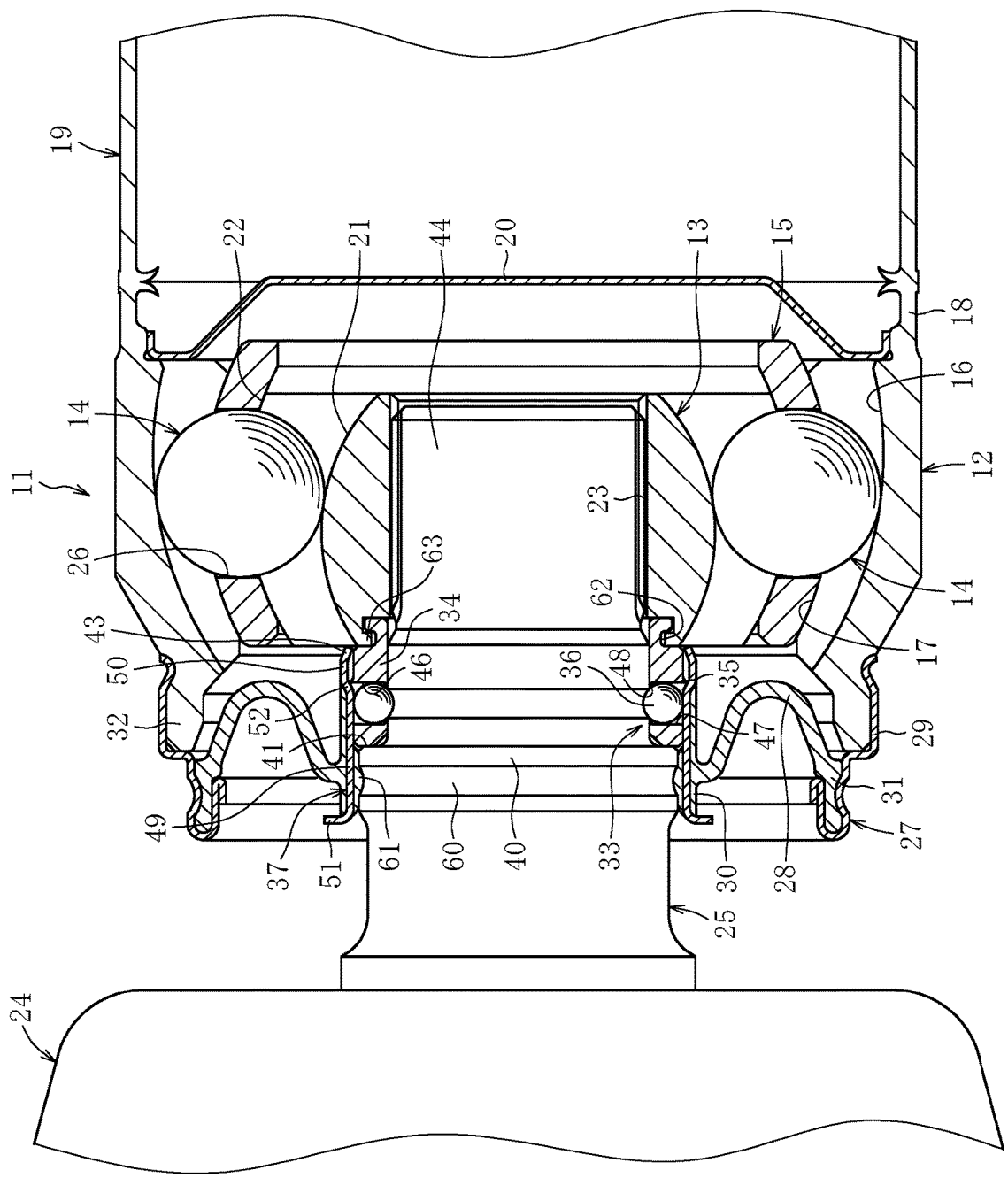
FIG. 11 is a sectional view for illustrating an overall configuration of a constant velocity universal joint according to further another embodiment of the present invention.

Further, in the embodiments illustrated in FIG. 1 and FIG. 8, there is exemplified the structure in which the locking groove 38 is formed in the inner joint member 13, and the locking claw 39 is formed on the tubular member 34. However, the present invention is not limited thereto, and structures as illustrated in FIG. 10 and FIG. 11 may be employed. In FIG. 10 and FIG. 11, the same parts as those in FIG. 1 and FIG. 8 are denoted by the same reference symbols, and redundant description is omitted.

In embodiments illustrated in FIG. 10 and FIG. 11, an annular locking groove 62 is formed in an outer peripheral surface of a projecting end portion of the tubular member 34, which is located on the propeller shaft 19 side, and an annular locking claw 63 is formed on an inner peripheral surface of an end portion of the inner joint member 13, which is located on the transmission 24 side. The locking claw 63 of the inner joint member 13 is fitted to the locking groove 62 of the tubular member 34. In this manner, the tubular member 34 and the inner joint member 13 are coupled to each other.

The tubular member 34 has a slit (not shown) formed therein so as to be capable of being reduced in diameter. When the tubular member 34 is to be assembled to the inner joint member 13, the tubular member 34 is reduced in diameter using the slit of the tubular member 34 so that the locking claw 63 of the inner joint member 13 and the locking groove 62 of the tubular member 34 are easily fitted to each other. Even when such slit is formed, the inner periphery of the tubular member 34 after the assembly is constrained by the power transmission shaft 25. Thus, the tubular member 34 is not unnecessarily reduced in diameter.

In the case of the embodiment illustrated in FIG. 10, the end portion 43 on the propeller shaft side of the annular member 37 is locked to the end surface of the inner joint member 13, and the end portion 51 on the transmission side of the annular member 37 is locked to the snap ring 54. In this manner, the annular member 37 is regulated in position on both sides in the axial direction with respect to the power transmission shaft 25 and the tubular member 34.

In the embodiments illustrated in FIG. 1 and FIG. 8, in order that the inner joint member 13 is fitted and coupled to the tubular member 34 on the outer peripheral side of the inner joint member 13, it is required that the projecting end portion be formed on the transmission 24 side of the inner joint member 13. Thus, it is required for a working tool to avoid interference with the projecting end portion at the time of forming the track grooves 21. In contrast, in the embodiments illustrated in FIG. 10 and FIG. 11, the inner joint member 13 is fitted and coupled to the tubular member 34 on the inner peripheral side of the inner joint member 13, and hence it is not required that the projecting end portion be formed on the transmission 24 side of the inner joint member 13. Thus, the track grooves 21 are easily formed, and further, the axial dimension of the inner joint member 13 is also reduced.

In the embodiment illustrated in FIG. 10, the following structure is exemplified. Specifically, similarly to the embodiment illustrated in FIG. 1, a recessed groove 56 is formed in the outer peripheral surface of the large-diameter portion 40 of the power transmission shaft 25, and an O-ring 57 is fitted to the recessed groove 56 so that the inner peripheral surface of the annular member 37 is held in close contact with the O-ring 57.

Meanwhile, in the embodiment illustrated in FIG. 11, the following structure is exemplified. Specifically, similarly to the embodiment illustrated in FIG. 8, an annular recess 60 is formed in the outer peripheral surface of the large-diameter portion 40 of the power transmission shaft 25, and the rubber member of the boot 28 is also bonded to the inner peripheral surface of the annular member 37 through vulcanization to form the seal portion 61 so that the annular member 37 is held in close contact with the power transmission shaft 25 through concavo-convex fitting between the seal portion 61 and the recess 60.

In the embodiments illustrated in FIG. 10 and FIG. 11, the tubular member 34 being an integrated component is exemplified. At the time of assembling the tubular member 34 to the inner joint member 13, the tubular member 34 is decreased in diameter using the slit so that the locking claw 63 of the inner joint member 13 and the locking groove 62 of the tubular member 34 are fitted to each other.

In such tubular member 34 being an integrated component, rigidity is high depending on dimensions or a material (such as carbon steel or sintered metal) of the tubular member 34, and hence there is concern that a large force is required for decrease in diameter, and plastic deformation remains after the decrease in diameter.

Figure 12:
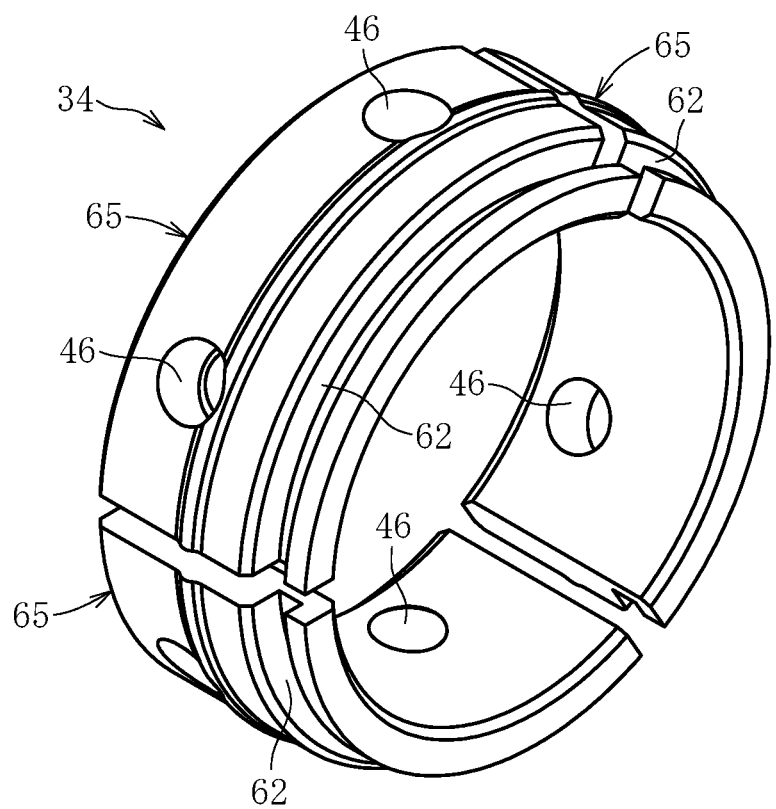
FIG. 12 is a perspective view for illustrating the tubular member having a divided structure in the mounting and dismounting mechanism of FIG. 10 and FIG. 11.

In view of this, the following structure is effective. Specifically, as in an embodiment illustrated in FIG. 12, the tubular member 34 comprises a plurality of (three in FIG. 12) divided members 65 divided in the circumferential direction. The number of the divided members 65 may be other than three, and the number may be freely selected.

With this structure, without decreasing the diameter of the tubular member 34, the locking claw 63 of the inner joint member 13 and the locking groove 62 of the tubular member 34 can be fitted to each other. In this manner, the tubular member 34 can easily be assembled to the inner joint member 13.

In the divided structure of the tubular member 34, it is only required that a simple core material such as sponge or plastic be inserted along the inner periphery of the tubular member 34 at the time of handling. That is, when the tubular member 34 is assembled to the inner joint member 13 so that the fixing members 36 are received in the through holes 46, and, after the annular member 37 is inserted externally on the tubular member 34, the core material is removed immediately before the power transmission shaft 25 is incorporated, movement and separation of the divided members 65 of tubular member 34 can be prevented.

Further, in the embodiments illustrated in FIG. 1 and FIG. 8 or the embodiments illustrated in FIG. 10 and FIG. 11, there is exemplified the tubular member 34 in which the opening portions 48 on the inner peripheral side of the through holes 46 are reduced in diameter. With this, at the time of assembling the annular member 37 to the tubular member 34, the fixing members 36 received in the through holes 46 can be prevented from dropping off to the inner peripheral side of the tubular member 34. However, the present invention is not limited thereto, and a structure as illustrated in FIG. 13 may be employed.

Figure 13:
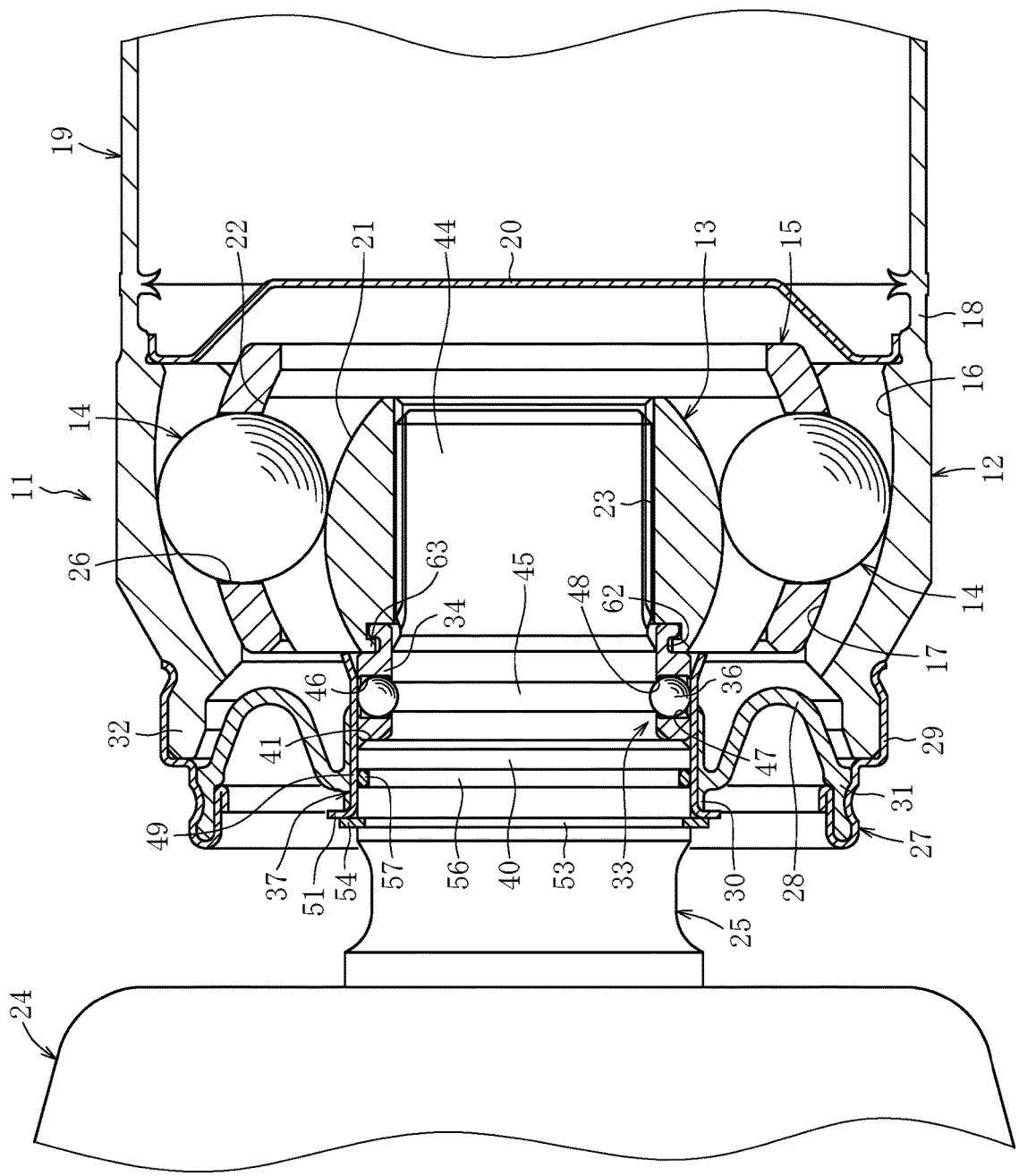
FIG. 13 is a sectional view for illustrating an overall configuration of a constant velocity universal joint according to still further another embodiment of the present invention.
Figure 14:
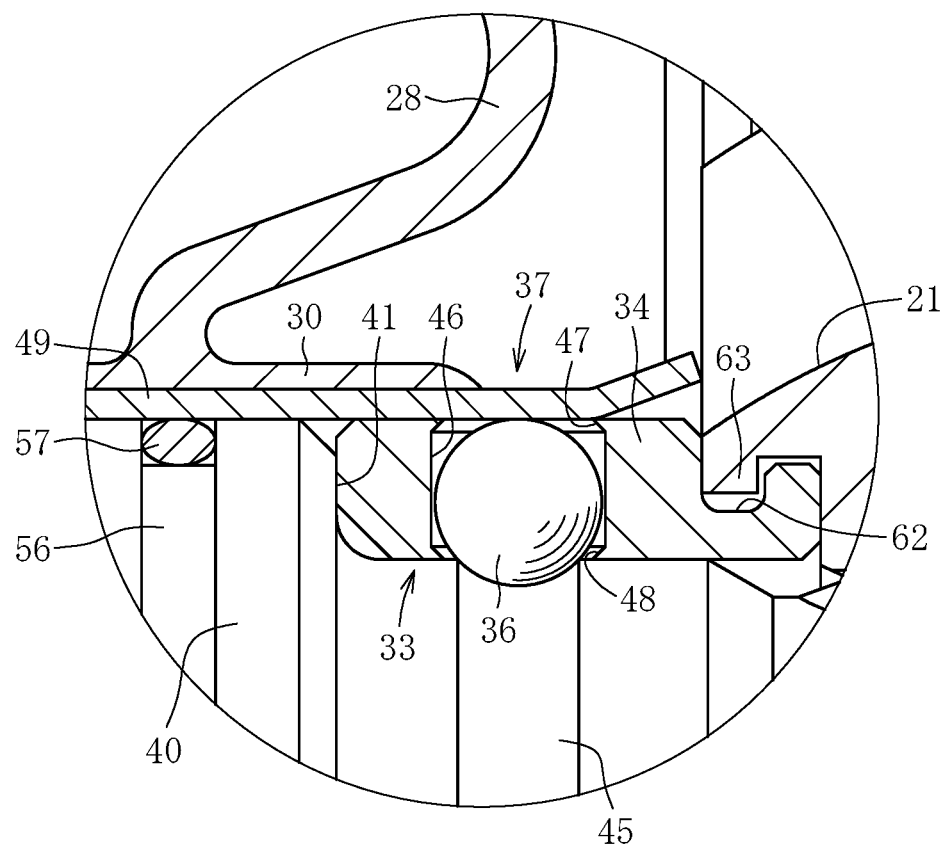
FIG. 14 is an enlarged sectional view of a main part of FIG. 13.

FIG. 13 corresponds to an embodiment applied to the tubular member 34 illustrated in FIG. 10, and the same parts as those in FIG. 10 are denoted by the same reference symbols, and redundant description is omitted. FIG. 14 is an enlarged sectional view of a main part of FIG. 13. Although a structure illustrated in FIG. 13 and FIG. 14 is also applicable to other embodiments illustrated in FIG. 1, FIG. 8, and FIG. 11, the case of applying to the tubular member 34 in FIG. 10 is described below.

In an embodiment illustrated in FIG. 13 and FIG. 14, the opening portions 47 on the outer peripheral side of the through holes 46 of the tubular member 34 are reduced in diameter so as to each have an inner diameter slightly smaller than the outer diameter of each of the fixing members 36. With this, at the time of assembling the annular member 37 to the tubular member 34, the fixing members 36 received in the through holes 46 of the tubular member 34 are prevented from dropping off to the radially outer side of the tubular member 34.

As described above, through employment of the structure in which the opening portions 47 on the outer peripheral side of the through holes 46 of the tubular member 34 are reduced in diameter, as in an embodiment illustrated in FIG. 10, at the time of assembling the annular member 37 to the tubular member 34, it is not required to prevent the fixing members 36 from dropping off, thereby which the outer peripheral surface of the tubular member 34 is covered by the annular member 37.

Therefore, in the embodiment illustrated in FIG. 13, even when the annular member 37 is absent under the state in which the fixing members 36 are incorporated in the tubular member 34, the fixing members 36 are prevented from dropping off to the radially outer side of the tubular member 34, thereby facilitating assembly of the mounting and dismounting mechanism 33.

Further, with the structure in which the opening portions 47 on the outer peripheral side of the through holes 46 of the tubular member 34 are reduced in diameter, unlike in the embodiment in FIG. 10, it is not required to form the large-diameter cylindrical portion 50 or the diameter reducing portion (end portion 43 on the propeller shaft side) on the annular member 37, and the hooking portion 35 on the tubular member 34. That is, the shapes of the annular member 37 and the tubular member 34 can be simplified, thereby simplifying manufacturing steps.

The tubular member 34 in the embodiment illustrated in FIG. 13 may be manufactured through any of molding of resin or a machining process on metals. However, in consideration of the ease of incorporation of the fixing members 36, the ease of manufacture, and processing cost, a molded product made of a thermoplastic resin having high elasticity such as nylon is most preferred.

In this embodiment, the opening portions 48 on the inner peripheral side of the through holes 46 and the opening portions 47 on the outer peripheral side of the tubular member 34 are reduced in diameter over the entire periphery. The portion that is reduced in diameter maybe formed into projection shapes by partially reducing the diameter of each of the opening portions 48 on the inner peripheral side and the opening portions 47 on the outer peripheral side along the circumferential direction at a plurality of positions.

Although not illustrated in an embodiment, instead of reducing the diameter of each the opening portions 48 on the inner peripheral side and the opening portions 47 on the outer peripheral side of the through holes 46 of the tubular member 34, the inner diameter of each of the through holes 46 is set slightly smaller than the outer diameter of each of the fixing members 36 to form an interference, thereby preventing the fixing members 36 from dropping off the through holes 46.

In this embodiment, the O-ring 57 is fitted to the recessed groove 56 of the power transmission shaft 25, thereby ensuring the sealing property of preventing leakage of lubricant sealed inside the joint and preventing entry of foreign matters from outside the joint between the annular member 37 and the power transmission shaft 25.

Further, the snap ring 54 is fitted to the recessed groove 53 of the power transmission shaft 25, and the end portion 51 on the transmission side of the annular member 37 is locked to the snap ring 54. In this manner, movement of the annular member 37 in the axial direction to the transmission side with respect to the power transmission shaft 25 is regulated.

Figure 15:
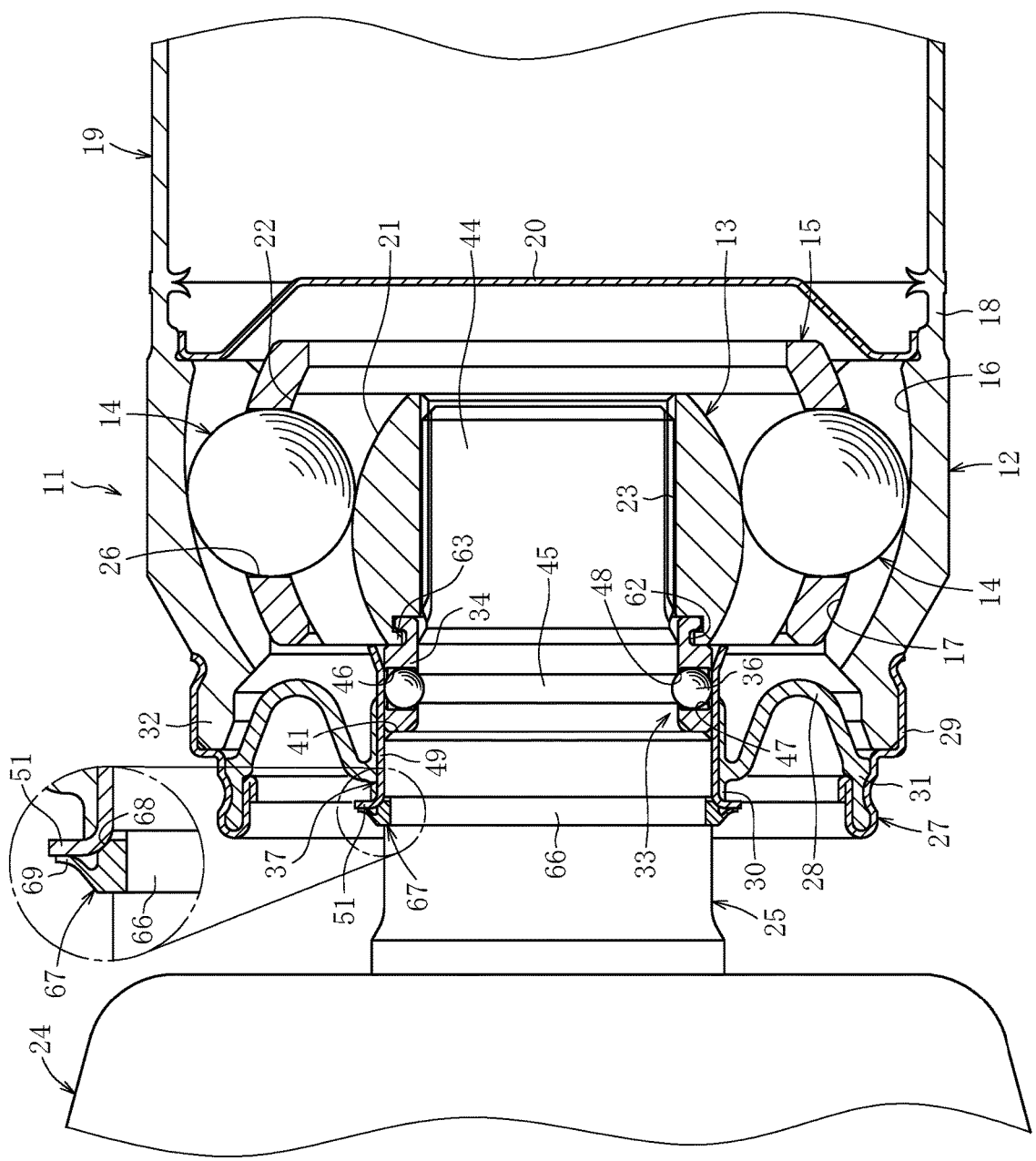
FIG. 15 is a sectional view for illustrating an overall configuration of a constant velocity universal joint according to yet another embodiment of the present invention.

In contrast, the mounting and dismounting mechanism 33 in an embodiment illustrated in FIG. 15 has a structure in which an annular recessed groove 66 is formed in the outer peripheral surface of the power transmission shaft 25, and a seal member 67 held in abutment against the end portion 51 on the transmission side of the annular member 37 is fitted to the recessed groove 66.

The seal member 67 is made of rubber or resin. An axial force acting on the annular member 37 during an operation of the constant velocity universal joint is as large as a reaction force of the boot 28 at the time of deformation. Thus, when the seal member 67 is fitted to the recessed groove 66, for example, with removal durability of about 20N, the seal member 67 is not removed from the recessed groove 66 even under an axial load.

The seal member 67 comprises a contact surface 68, and a seal lip 69. The contact surface 68 is configured to regulate movement of the annular member 37 in the axial direction by interfering with the end portion 51 on the transmission side of the annular member 37. The seal lip 69 exerts a seal function while being held in contact with the end portion 51 on the transmission side of the annular member 37. The seal lip 69 has flexibility so as to follow the annular member 37 even when relative movement in the axial direction slightly occurs between the seal member 67 and the annular member 37.

In the embodiment illustrated in FIG. 15, the seal member 67 having the above-mentioned configuration is provided. Thus, unlike in the embodiment illustrated in FIG. 13, it is not required to form the two recessed grooves 56 and 53 in the power transmission shaft 25, and to provide two components, that is, the O-ring 57 and the snap ring 54.

That is, with the single recessed groove 66 in the power transmission shaft 25 and the single seal member 67, the sealing property can be ensured, and movement of the annular member 37 in the axial direction to the transmission side with respect to the power transmission shaft 25 can be regulated. As a result, processing for the recessed groove 56 of the power transmission shaft 25 and the snap ring 54 can be omitted, thereby easily reducing processing cost and the number of components.

When the constant velocity universal joint and the mounting and dismounting mechanism 33 are to be assembled to the power transmission shaft 25, it is only required that the seal member 67 be inserted externally on the power transmission shaft 25 in advance, and be arranged closer to the transmission side than to the recessed groove 66, and that, after incorporation of the annular member 37 is completed, the seal member 67 be fitted to the recessed groove 66.

Figure 16:
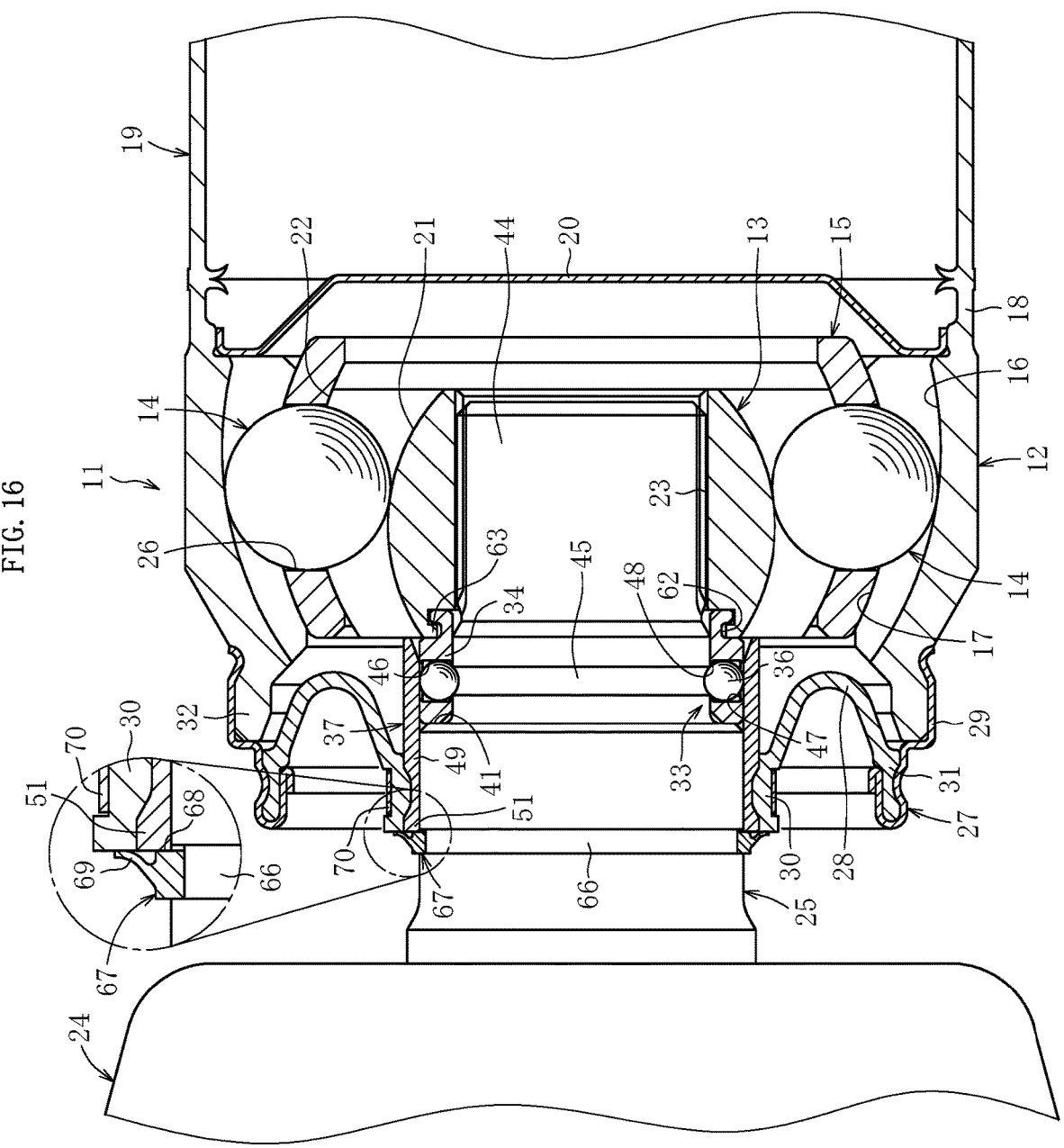
FIG. 16 is a sectional view for illustrating an overall configuration of a constant velocity universal joint according to yet another embodiment of the present invention.

In the above-mentioned embodiments, there is exemplified the structure in which the annular member 37 is integrally mounted to the small-diameter end portion 30 of the boot 28, which forms a part of the seal mechanism 27, by vulcanization bonding. However, as illustrated in FIG. 16 and FIG. 17, there may be employed a structure in which the annular member 37 and the small-diameter end portion 30 of the boot 28 are formed as separate members. That is, the seal mechanism 27 in embodiments illustrated in FIG. 16 and FIG. 17 has a structure in which the small-diameter end portion 30 of the boot 28 is fixed to the annular member 37 with a boot clamp 70.

In the embodiment illustrated in FIG. 16, the seal lip 69 of the seal member 67 is held in contact with the small-diameter end portion 30 of the boot 28. Further, the contact surface 68 of the seal member 67 is held in abutment against the end portion 51 on the transmission side of the annular member 37. With this, the sealing property is ensured, and movement of the annular member 37 in the axial direction to the transmission 24 side with respect to the power transmission shaft 25 is regulated.

In the embodiment illustrated in FIG. 17, an O-ring 71 is used as the seal member. In this case, a tapered surface 72 is formed on the end portion 51 on the transmission side of the annular member 37, and the O-ring 71 is sandwiched between the tapered surface 72 and the recessed groove 66 of the power transmission shaft 25. With this, the O-ring 71 is elastically deformed so that the sealing property is ensured, and movement of the annular member 37 in the axial direction to the transmission 24 side with respect to the power transmission shaft 25 is regulated.

The present invention is not limited to the above-mentioned embodiments. As a matter of course, the present invention may be carried out in various modes without departing from the spirit of the present invention. The scope of the present invention is defined in claims, and encompasses equivalents of description in claims and all changes within the scope of claims.

The invention claimed is:

1. A constant velocity universal joint, comprising:
an outer joint member; and
an inner joint member configured to transmit torque between the inner joint member and the outer joint member through intermediation of torque transmission members while allowing angular displacement,
wherein a power transmission shaft is coupled to the inner joint member so as to allow torque transmission therebetween,
wherein a mounting and dismounting mechanism configured to mount and dismount the power transmission shaft to and from the inner joint member is provided between the inner joint member and the power transmission shaft,
wherein the mounting and dismounting mechanism comprises:
a tubular member inserted externally on the power transmission shaft so as to extend from the inner joint member;
a fixing member received in the tubular member so as to be movable in a radial direction; and
an annular member arranged on an outer periphery of the tubular member so as to be movable in an axial direction,
wherein the fixing member in the tubular member is moved in the radial direction along with movement of the annular member in the axial direction so that the fixing member is mountable to and dismountable from the power transmission shaft, and
wherein the annular member is fixed to an end portion of a boot configured to close an opening of the outer joint member.

2. The constant velocity universal joint according to claim 1,
wherein, in the mounting and dismounting mechanism, a locking groove is formed at any one of an end portion of the inner joint member and an end portion of the tubular member, and a locking claw is formed on another one of the end portion of the inner joint member and the end portion of the tubular member, and
wherein the locking claw is fitted to the locking groove so that the inner joint member and the tubular member are coupled to each other.

3. The constant velocity universal joint according to claim 1, wherein the tubular member of the mounting and dismounting mechanism comprises a plurality of divided members divided in a circumferential direction.

4. The constant velocity universal joint according to claim 1, wherein, in the mounting and dismounting mechanism, an annular recessed groove is formed in an outer peripheral surface of the power transmission shaft so that the recessed groove of the power transmission shaft and the fixing member in the tubular member are allowed to be coupled to and separated from each other.

5. The constant velocity universal joint according to claim 1, wherein, in the mounting and dismounting mechanism, through holes are formed at a plurality of positions of the tubular member in a circumferential direction so as to be opened to inner peripheries and outer peripheries of the tubular member, and the fixing member having a spherical shape is arranged in each of the through holes so that the fixing member is allowed to freely protrude and retreat with respect to an opening on an inner peripheral side and an opening on an outer peripheral side of each of the through holes.

6. The constant velocity universal joint according to claim 5, wherein, in the mounting and dismounting mechanism, at least one of the opening on the inner peripheral side and the opening on the outer peripheral side of each of the through holes of the tubular member is reduced in diameter so as to have an inner diameter smaller than an outer diameter of the fixing member.

7. The constant velocity universal joint according to claim 1, wherein, in the mounting and dismounting mechanism, a seal portion bonded to an inner peripheral surface of the annular member through vulcanization is formed, and the seal portion is fitted to an annular recess formed in the power transmission shaft through concavo-convex fitting.

8. The constant velocity universal joint according to claim 1, wherein, in the mounting and dismounting mechanism, an annular recessed groove is formed in an outer peripheral surface of the power transmission shaft, and a seal member held in abutment against an end portion of the annular member is fitted to the recessed groove.

* * * * *